(12) United States Patent
Mirkin et al.

(10) Patent No.: US 11,465,339 B2
(45) Date of Patent: Oct. 11, 2022

(54) METHOD FOR THE FABRICATION OF THREE-DIMENSIONAL OBJECTS AND APPARATUS FOR SAME

(71) Applicant: NORTHWESTERN UNIVERSITY, Evanston, IL (US)

(72) Inventors: Chad A. Mirkin, Wilmette, IL (US); David A. Walker, Evanston, IL (US); James L. Hedrick, III, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 489 days.

(21) Appl. No.: 16/098,040

(22) PCT Filed: May 31, 2017

(86) PCT No.: PCT/US2017/035221
§ 371 (c)(1),
(2) Date: Oct. 31, 2018

(87) PCT Pub. No.: WO2017/210298
PCT Pub. Date: Dec. 7, 2017

(65) Prior Publication Data
US 2019/0160733 A1    May 30, 2019

Related U.S. Application Data

(60) Provisional application No. 62/343,655, filed on May 31, 2016.

(51) Int. Cl.
*B29C 64/129* (2017.01)
*B33Y 10/00* (2015.01)
(Continued)

(52) U.S. Cl.
CPC .......... *B29C 64/129* (2017.08); *B29C 64/245* (2017.08); *B29C 64/264* (2017.08);
(Continued)

(58) Field of Classification Search
CPC ... B29C 64/129; B29C 64/264; B29C 64/245; B29C 67/00; B29C 67/24; B33Y 10/00; B33Y 30/00; G03C 9/08
See application file for complete search history.

(56) References Cited

U.S. PATENT DOCUMENTS

| 4,337,130 A | 6/1982 | Ahramjian |
| 4,765,818 A | 8/1988 | Che et al. |

(Continued)

FOREIGN PATENT DOCUMENTS

| CN | 105109048 | * 12/2015 | ............. B33Y 30/00 |
| CN | 105122136 A | 12/2015 | |

(Continued)

OTHER PUBLICATIONS

Donzel et al., Hydrophilic Poly(dimethylsiloxane) Stamps for Microcontact Printing, Adv. Mater., 13(15):1164-7 (2001).

(Continued)

*Primary Examiner* — Jeffrey M Wollschlager
*Assistant Examiner* — Shibin Liang
(74) *Attorney, Agent, or Firm* — Marshall, Gerstein & Borun LLP

(57) ABSTRACT

Methods and apparatus comprising a dewetting phase and a polymerization liquid that are immiscible, and can be used for the formation of three-dimensional objects, wherein the method does not require a dead zone. Additionally, methods and apparatus that employ an optically transparent cooling apparatus to mitigate heat generated during the fabrication process, and the use of a mobile phase to provide a shearing interface to reduce interfacial adhesive forces.

10 Claims, 7 Drawing Sheets

(51) Int. Cl.
*B29C 67/00* (2017.01)
*B29C 64/245* (2017.01)
*B29C 64/264* (2017.01)
*B29C 67/24* (2006.01)

(52) U.S. Cl.
CPC .............. *B29C 67/00* (2013.01); *B29C 67/24* (2013.01); *B33Y 10/00* (2014.12)

(56) References Cited

U.S. PATENT DOCUMENTS

| | | | |
|---|---|---|---|
| 5,017,461 | A | 5/1991 | Abe |
| 5,122,441 | A * | 6/1992 | Lawton ................. B29C 64/129 430/320 |
| 5,192,559 | A | 3/1993 | Hull et al. |
| 5,236,637 | A | 8/1993 | Hull |
| 5,248,456 | A | 9/1993 | Evans, Jr. et al. |
| 5,374,500 | A | 12/1994 | Carpenter, Jr. et al. |
| 5,481,356 | A | 1/1996 | Pouet et al. |
| 5,691,541 | A | 11/1997 | Ceglio et al. |
| 5,776,748 | A | 7/1998 | Singhvi et al. |
| 5,836,313 | A | 11/1998 | Perez et al. |
| 6,238,852 | B1 | 5/2001 | Klosner |
| 6,248,509 | B1 | 6/2001 | Sanford |
| 6,312,134 | B1 | 11/2001 | Jain et al. |
| 6,500,549 | B1 | 12/2002 | Deppisch et al. |
| 6,596,346 | B2 | 7/2003 | Bernard et al. |
| 6,602,975 | B2 | 8/2003 | Hubbell et al. |
| 6,692,891 | B2 | 2/2004 | Jung et al. |
| 6,932,930 | B2 | 8/2005 | DeSimone et al. |
| 6,939,940 | B2 | 9/2005 | Dingemans et al. |
| 7,108,947 | B2 | 9/2006 | Wu et al. |
| 7,368,514 | B2 | 5/2008 | Lee et al. |
| 7,438,846 | B2 | 10/2008 | John |
| 7,507,784 | B2 | 3/2009 | Dingemans et al. |
| 7,534,844 | B2 | 5/2009 | Lee et al. |
| 7,550,246 | B2 | 6/2009 | Fukuzumi et al. |
| 7,556,490 | B2 | 7/2009 | Wicker et al. |
| 7,649,029 | B2 | 1/2010 | Kolb et al. |
| 7,651,682 | B2 | 1/2010 | Devore et al. |
| 7,651,683 | B2 | 1/2010 | Devore et al. |
| 7,709,597 | B2 | 5/2010 | Tamura |
| 7,767,728 | B2 | 8/2010 | Lu et al. |
| 7,824,839 | B2 | 11/2010 | Ober et al. |
| 7,902,526 | B2 | 3/2011 | Kim et al. |
| 7,919,162 | B2 | 4/2011 | DeSimone et al. |
| 7,935,476 | B2 | 5/2011 | Teng |
| 8,119,214 | B2 | 2/2012 | Schwantes et al. |
| 8,147,918 | B2 | 4/2012 | Standke et al. |
| 8,232,043 | B2 | 7/2012 | Williamson et al. |
| 8,242,299 | B2 | 8/2012 | Shelekhov |
| 9,121,307 | B2 | 9/2015 | Aizenberg et al. |
| 9,205,601 | B2 | 12/2015 | DeSimone et al. |
| 9,211,678 | B2 | 12/2015 | DeSimone et al. |
| 9,216,546 | B2 | 12/2015 | DeSimone et al. |
| 10,118,377 | B2 | 11/2018 | Castanon |
| 10,232,552 | B2 | 3/2019 | Baltaji et al. |
| 10,259,171 | B2 | 4/2019 | Robeson et al. |
| 10,328,634 | B2 | 6/2019 | Zitelli et al. |
| 10,357,919 | B2 | 7/2019 | Tringali et al. |
| 10,836,104 | B2 | 11/2020 | Zitelli et al. |
| 2005/0003189 | A1 | 1/2005 | Bredt et al. |
| 2007/0063389 | A1 | 3/2007 | John |
| 2008/0134940 | A1 | 6/2008 | Wheeler |
| 2009/0148813 | A1 | 6/2009 | Sun et al. |
| 2010/0310698 | A1 | 12/2010 | Klare et al. |
| 2011/0190923 | A1 | 8/2011 | Matsui et al. |
| 2013/0292862 | A1 | 11/2013 | Joyce |
| 2013/0295212 | A1 | 11/2013 | Chen et al. |
| 2015/0138723 | A1 * | 5/2015 | Shedd ...................... F25B 25/00 361/679.47 |
| 2015/0233567 | A1 | 8/2015 | Karam |
| 2016/0059484 | A1 | 3/2016 | DeSimone et al. |
| 2016/0198576 | A1 | 7/2016 | Lewis et al. |
| 2016/0221267 | A1 | 8/2016 | John et al. |
| 2017/0028618 | A1 * | 2/2017 | Robeson ................. B29C 64/129 |
| 2017/0129167 | A1 | 5/2017 | Castanon |
| 2019/0047213 | A1 | 2/2019 | Stadlmann |
| 2019/0143584 | A1 † | 5/2019 | Hanrath et al. |

FOREIGN PATENT DOCUMENTS

| | | | |
|---|---|---|---|
| CN | 205033603 | U | 2/2016 |
| CN | 105109048 | B | 9/2017 |
| JP | S62288844 | A | 12/1987 |
| JP | 2005047096 | A | 2/2005 |
| WO | WO-93/20993 | A1 | 10/1993 |
| WO | WO-2009/132321 | A1 | 10/2009 |
| WO | WO-2012/129968 | A1 | 10/2012 |
| WO | WO-2014/012080 | A1 | 1/2014 |
| WO | 2014/126830 | A2 † | 8/2014 |
| WO | WO-2014/126830 | A2 | 8/2014 |
| WO | WO-2014/126837 | A2 | 8/2014 |
| WO | WO-2015/105762 | A1 | 7/2015 |
| WO | WO-2015/119943 | A1 | 8/2015 |
| WO | 2015/164234 | A1 † | 10/2015 |
| WO | WO-2015/164234 | A1 | 10/2015 |
| WO | WO-2015/195920 | A1 | 12/2015 |
| WO | WO-2017/161398 | A1 | 9/2017 |
| WO | WO-2017/210298 | A1 | 12/2017 |

OTHER PUBLICATIONS

He et al., Preparation of Hydrophilic Poly(dimethylsiloxane) Stamps by Plasma-Induced Grafting, Langmuir, 19(17):6982-6 (2003).
International Application No. PCT/US2017/035221, International Search Report and Written Opinion, dated Aug. 30, 2017.
Martin et al., Direct protein microarray fabrication using a hydrogel "stamper", Langmuir, 14(15):3971-5 (1998).
Pan et al., A Fast Mask Projection Stereolithography Process for Fabricating Digital Models in Minutes, J. Manuf. Sci. Eng., 134(5):051011 (Sep. 10, 2012).
Photoacid Generator Selection Guide for the Electronics Industry and Energy Curable Coatings, BASF (2010).
Photoinitiators for UV Curing, Formulators' Guide for Coatings, Ciba Specialty Chemicals, Inc. (2003).
Schmid et al., Siloxane Polymers for High-Resolution, High-Accuracy Soft Lithography, 33(8):3042-9 (2000).
Walker et al., Rapid, large-volume thermally controlled 3D printing using a mobile liquid interface, Science, 366(6463):360-364 (Oct. 2019).
International Application No. PCT/US2020/021729, International Search Report and Written Opinion, dated Oct. 14, 2020.
Japanese Patent Application No. 2018-562958, Notice of Reasons for Rejection, dated Jun. 8, 2021.
Chen et al., Tip-Directed Synthesis of Multimetallic Nanoparticles, J. Am. Chem. Soc., 137:9167-9173 (2015).
Favre et al., Tailorable Thermomechanical Properties Through Reactive Blending and Layer-by-Layer Deposition of Poly(1,3,5-hexahydro-1,3,5-triazine) (PHT) Networks, Advanced Functional Materials, 26(30) (May 2016).
Hedrick et al., Hard Transparent Arrays for Polymer Pen Lithography, ACS Nano, 10:3144-8 (2016).
Huo et al., Beam pen lithography, Nat. Nanotechnol., 5(9):637-40 (2010).
International Application No. PCT/US20/21729, International Search Report and Written Opinion, dated Oct. 14, 2020.
Kim et al., Hierarchical or not? Effect of the length scale and hierarchy of the surface roughness on omniphobicity of lubricant-infused substrates, Nano Letters, 13:1793-9 (2013).
Kuang et al. High-Speed 3D Printing of High-Performance Thermosetting Polymers via Two-Stage Curing, Macromol. Rapid Commun., 39(7):1700809 (2018).
Leslie et al., A bioinspired omniphobic surface coating on medical devices prevents thrombosis and biofouling, Nat. Biotechnol., 32(11):1134-40 (2014).
Pan et al., A fast mask projection stereolithography process for fabricating digital models in minutes, J. Manufacturing Sci. and Eng. 134, 051011-1-051011-9 (Oct. 2012).

(56) References Cited

OTHER PUBLICATIONS

Tumbleston et al., Additive manufacturing. Continuous liquid interface production of 3D objects, Science, 347(6228):1349-52 (2015).
Wu et al., Apertureless beam pen lithography based on fully metal-coated polyurethane-acrylate (PUA) pyramidal microstructure array, Opt. Express, 22(9):10593-604 (2014).
Xie et al., On-Tip Photo-Modulated Molecular Printing, Angew Chem Int Ed., 54(44):12894-9 (2015).

\* cited by examiner
† cited by third party

METHOD FOR THE FABRICATION OF THREE-DIMENSIONAL OBJECTS AND APPARATUS FOR SAME

STATEMENT OF GOVERNMENT SUPPORT

This invention was made with government support under grant number FA9550-16-1-0150 awarded by the Air Force Office of Scientific Research. The government has certain rights in the invention.

FIELD OF THE INVENTION

The disclosure relates generally to methods and apparatus for the fabrication of three-dimensional objects. More particularly, the disclosure relates to methods and apparatus for the fabrication of solid three-dimensional objects in a bottom-up fashion from a polymerizable liquid without the need of a dead zone or inhibition layer and/or at the interface of solid-liquid, liquid-hydrogel, solid-solid, or solid-hydrogel phases. The disclosure also relates to the use of an optically transparent cooling apparatus to mitigate heat generated during the fabrication process, and using a mobile phase to provide a shearing interface to reduce interfacial adhesive forces.

BACKGROUND

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4, where the polymerizable liquid is floated on top of a non-wetting immiscible liquid layer. Such techniques have not, however, been commercialized and dramatically different techniques for "bottom up" fabrication have been implemented instead. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, South Dakota, USA, employ a sliding build plate to induce mechanical cleavage after a layer has been solidified. See, e.g., M. Joyce, US Patent App. 2013/0292862 and Y. Chen et al., US Patent App. 2013/0295212 (both Nov. 7, 2013); see also Y. Pan et al., *J. Manufacturing Sci. and Eng.* 134, 051011-1 (October 2012). Such approaches introduce a mechanical step that may complicate the apparatus, slow the method, and/or potentially distort the end product.

Some "bottom-up" fabrication approaches, such as the Carbon3D system, utilizes a "dead zone" or "inhibition layer" in which polymerization is chemically quenched near a build interface. The "dead zone" is created by allowing a polymerization inhibitor, such as oxygen, to pass partly or fully through a semipermeable membrane to continuously feed inhibitor to the "dead zone." By preventing polymerization at the interface, adhesion is avoided and the solidified material can be continuously pulled away from the build region. However, this system has several limitations. In particular, the "dead zone" is highly temperature sensitive and minor fluctuations can cause the print to fail. Additionally, the polymerization reaction is extremely exothermic and the heat must be dissipated without disruption of the "dead-zone." However, cooling configurations which are effective at dissipating excess heat over large areas—those which provide active cooling mechanisms—also inhibit oxygen permeation and the creation of the "dead-zone." As a result, the area of the build domain (i.e., the planar width and height) is limited to cooling configurations which do not infringe upon oxygen delivery to the "dead-zone."

Accordingly, there is a need for alternate methods and apparatus for three-dimensional fabrication that can obviate the need for mechanical separation steps in "bottom-up" fabrication.

SUMMARY

One aspect of the disclosure provides a method of forming a three-dimensional object, the method including providing an adhesion stage and a member, the member having a dewetting phase thereon, the dewetting phase having a build surface, the adhesion stage and the build surface defining a build region therebetween, providing a polymerizable liquid in the build region, wherein the polymerizable liquid is immiscible with the dewetting phase, and undergoing polymerization of the polymerizable liquid by exposing the build region to energy through at least a portion of the dewetting phase to form a solid polymer from the polymerizable liquid and advancing the adhesion stage away from the build surface to form the three-dimensional object comprised of the solid polymer, wherein the dewetting phase is not a liquid.

Another aspect of the disclosure provides a method of forming a three-dimensional object, the method including providing an adhesion stage, a member, and a cooling apparatus, the member having a dewetting phase thereon, the member between the cooling apparatus and the dewetting phase, the dewetting phase having a build surface, the adhesion stage and the build surface defining a build region therebetween, providing a polymerizable liquid in the build region, wherein the polymerizable liquid is immiscible with the dewetting phase, and undergoing polymerization of the polymerizable ink by exposing the build region to energy through at least a portion of the optically transparent cooling apparatus and through at least a portion of the dewetting phase to form a solid polymer from the polymerizable liquid and advancing the adhesion stage away from the build surface to form the three-dimensional object comprised of the solid polymer.

Another aspect of the disclosure provides an apparatus for forming a three-dimensional object from a polymerizable liquid, the apparatus including a support, an adhesion stage operatively associated with the support on which adhesion stage the three-dimensional object is formed, a member having a dewetting phase thereon, the dewetting phase having a build surface, wherein the dewetting phase is not a liquid, with the build surface and adhesion stage defining a build region therebetween, a polymerizable liquid supply operatively associated with the build surface and configured to supply polymerizable liquid into the build region for solidification or polymerization, an energy source configured to deliver energy to the build region through the member to form a solid polymer from the polymerizable liquid, at least one controller operatively associated with the energy source for delivering energy to the build region, the at least one controller also operatively associated with the adhesion stage for advancing the adhesion stage away from the build surface at a rate that is dependent on energy intensity to form the three-dimensional object from the solid polymer.

Another aspect of the disclosure provides an apparatus for forming a three-dimensional object from a polymerizable liquid, including a support, an adhesion stage operatively associated with the support on which adhesion stage the three-dimensional object is formed, a member having a layer of a dewetting phase thereon, the dewetting phase having a build surface, with the build surface and adhesion stage defining a build region therebetween, an optically transparent cooling apparatus, a polymerizable liquid supply operatively associated with the build surface and configured to supply polymerizable liquid into the build region for solidification or polymerization, an energy source configured to deliver energy to the build region through the member to form a solid polymer from the polymerizable liquid, and at least one controller operatively associated with the energy source for delivering energy to the build region, the at least one controller also operatively associated with the cooling apparatus for cooling the build region, the at least one controller also operatively associated with the adhesion stage for advancing the adhesion stage away from the build surface at a rate that is dependent on energy intensity to form the three-dimensional object from the solid polymer.

Another aspect of the disclosure provides a method of forming a three-dimensional object, the method including providing an adhesion stage and a member, the member having a mobile phase thereon, the mobile phase having a build surface, the adhesion stage and the build surface defining a build region therebetween, providing a polymerizable liquid in the build region, wherein the polymerizable liquid is immiscible with the mobile phase, and undergoing polymerization of the polymerizable liquid by exposing the build region to energy through at least a portion of the mobile phase to form a solid polymer from the polymerizable liquid and advancing the adhesion stage away from the build surface to form the three-dimensional object comprised of the solid polymer.

Another aspect of the disclosure provides an apparatus for forming a three-dimensional object from a polymerizable liquid, including a support, an adhesion stage operatively associated with the support on which adhesion stage the three-dimensional object is formed, a member having a layer of a mobile phase thereon, the mobile phase having a build surface, with the build surface and adhesion stage defining a build region therebetween, a polymerizable liquid supply operatively associated with the build surface and configured to supply polymerizable liquid into the build region for solidification or polymerization, an energy source configured to deliver energy to the build region through the member to form a solid polymer from the polymerizable liquid, and at least one controller operatively associated with the energy source for delivering energy to the build region, the at least one controller also operatively associated with the adhesion stage for advancing the adhesion stage away from the build surface at a rate that is dependent on energy intensity to form the three-dimensional object from the solid polymer.

For the methods and apparatus described herein, optional features, including but not limited to components, conditions, and steps are contemplated to be selected from the various aspects, embodiments, and examples provided herein.

Further aspects and advantages will be apparent to those of ordinary skill in the art from a review of the following detailed description. While the methods and apparatus are susceptible of embodiments in various forms, the description hereafter includes specific embodiments with the understanding that the disclosure is illustrative, and is not intended to limit the invention to the specific embodiments described herein.

DETAILED DESCRIPTION

Figure 1:
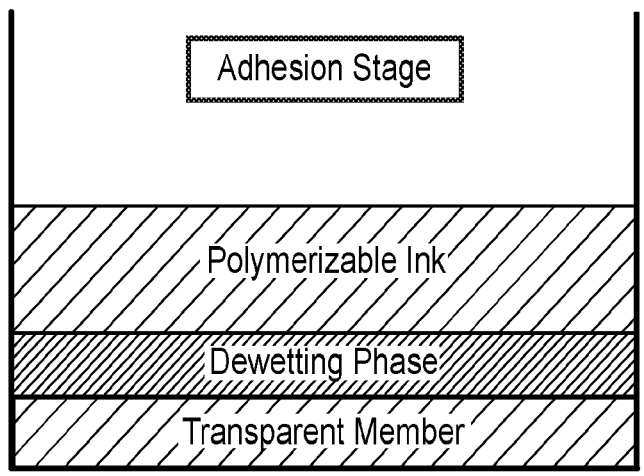
FIG. 1 is a side schematic view of one embodiment of an apparatus useful for carrying out a method as disclosed herein, in particular an apparatus having a transparent member, a dewetting phase provided on the transparent member, a polymerizable liquid provided on the dewetting phase, and an adhesion stage.

Provided herein are methods and apparatus of forming a three-dimensional object. In some aspects, the method includes providing an adhesion stage and a member, the member having a dewetting phase thereon, the dewetting phase having a build surface, the adhesion stage and the build surface defining a build region therebetween, providing a polymerizable liquid in the build region, wherein the polymerizable liquid is immiscible with the dewetting phase, and undergoing polymerization of the polymerizable liquid by exposing the build region to energy through at least a portion of the dewetting phase to form a solid polymer from the polymerizable liquid and advancing the adhesion stage away from the build surface to form the three-dimensional object comprised of the solid polymer, wherein the dewetting phase is not a liquid. Optionally, the dewetting phase is molecularly smooth. Optionally, the method further comprises a cooling apparatus, which can be arranged to cool the polymerizable liquid in view of the heat generated by an exothermic polymerization reaction. Optionally, the cooling apparatus is transparent and spans the build region and is provided between the light engine and the polymerization liquid. Optionally, the member is optically transparent. Optionally, the member is not oxygen permeable.

In some aspects, the method includes providing an adhesion stage, a member, and a cooling apparatus, the member having a dewetting phase thereon, the member between the cooling apparatus and the dewetting phase, the dewetting phase having a build surface, the adhesion stage and the build surface defining a build region therebetween, providing a polymerizable liquid in the build region, wherein the polymerizable liquid is immiscible with the dewetting phase, and undergoing polymerization of the polymerizable ink by exposing the build region to energy through at least a portion of the cooling apparatus and through at least a portion of the dewetting phase to form a solid polymer from the polymerizable liquid and advancing the adhesion stage away from the build surface to form the three-dimensional object comprised of the solid polymer. In embodiments of the foregoing aspects, the cooling apparatus is optically transparent. Optionally, the member is optically transparent. Optionally, the member is not oxygen permeable.

In some aspects, the method includes providing an adhesion stage and a member, the member having a mobile phase thereon, the mobile phase having a build surface, the adhesion stage and the build surface defining a build region therebetween, providing a polymerizable liquid in the build region, wherein the polymerizable liquid is immiscible with the mobile phase, and undergoing polymerization of the polymerizable liquid by exposing the build region to energy through at least a portion of the mobile phase to form a solid polymer from the polymerizable liquid and advancing the adhesion stage away from the build surface to form the three-dimensional object comprised of the solid polymer. Optionally, the mobile phase is recirculated through a closed loop. Optionally, the mobile phase moves across the member, but is not recirculated. Optionally, the method further comprises cooling the mobile phase. Optionally, the member is optically transparent. Optionally the member is not oxygen permeable.

Advancing the adhesion stage away from the build surface encompasses embodiments wherein the adhesion stage is mounted on an elevator to advance up and away from a stationary build surface and/or embodiments wherein the adhesion stage is fixed and the build surface is lowered to thereby advance the adhesion stage away therefrom. Advancing the adhesion stage away from the build surface further encompasses moving the adhesion stage toward the build surface, e.g., in an oscillating motion, provided that the net movement of the adhesion stage is away from the build surface.

Figure 4:
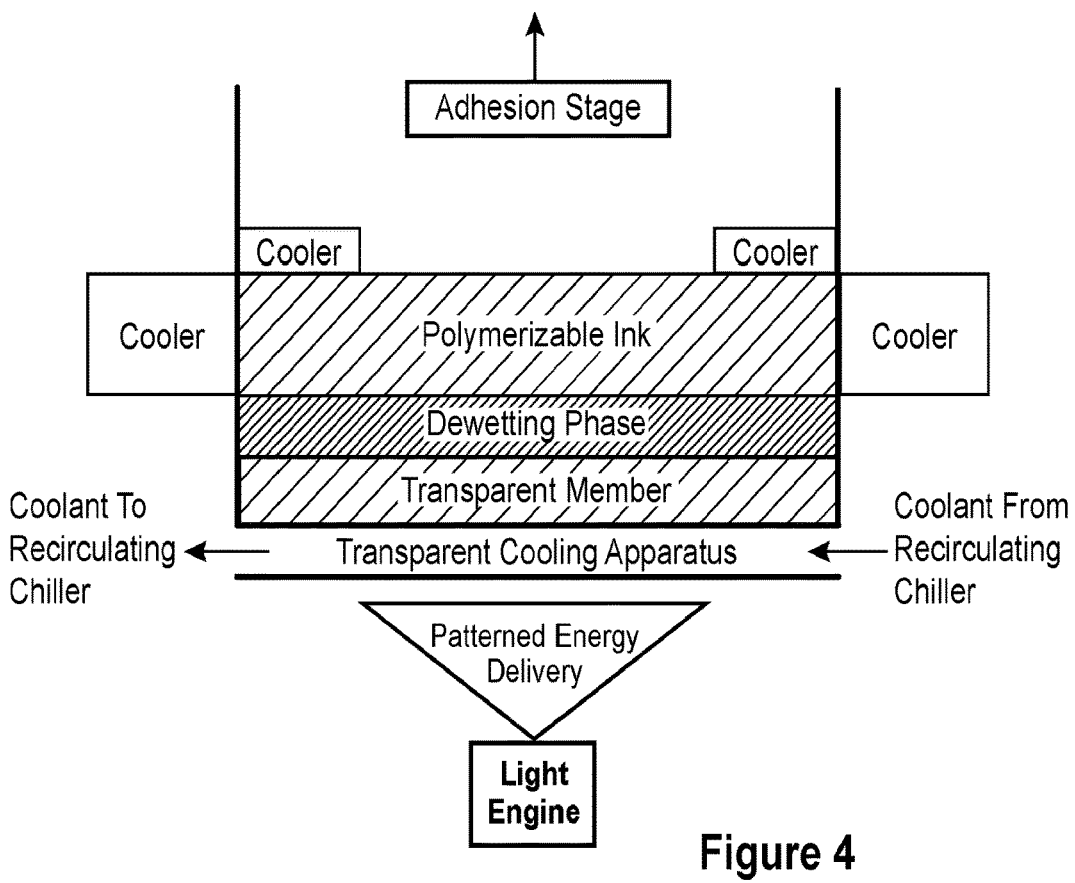
FIG. 4 is a side schematic view of one embodiment of an apparatus useful for carrying out a method as disclosed herein, in particular an apparatus having a transparent cooling apparatus, a transparent member provided on the transparent cooling apparatus, a dewetting phase provided on the transparent member, a polymerizable liquid provided on the dewetting phase, an adhesion stage, and additional cooling apparatus elements adjacent to the build region.

The methods disclosed herein provide one or more advantages, for example, providing for polymerization directly at the surface of the dewetting phase and the polymerization liquid, wherein the adhesive forces are sufficiently low that mechanical cleavage is not needed between each layer of deposited material. Additionally, by utilizing solid, semi-solid, and gel (e.g., hydrogel) dewetting phases, printing can advance along omni-directional axes (i.e. not be limited to horizontal printing planes). Further, the interface between the dewetting phase and the polymerization layer allows the system to be actively cooled by conventional heat exchangers that can span the entire span of the build domain (i.e. not just the perimeter of the build domain, thereby reliant on passive thermal diffusion), as shown in FIG. 4. Moreover, utilizing a mobile phase provides one of more advantages such as further minimizing adhesion forces between the emerging three-dimensional object and the mobile phase and facilitates replenishment of the polymerizable liquid in the build region. Additionally, utilization of a mobile phase allows for the continuous regeneration of the build surface, removal of microparticulate matter from the mobile phase, and/or a mechanism for direct active cooling.

Further still, by utilizing a low adhesion phase interface, the use of an 'inhibition zone' or "dead zone" in which the act of material deposition is quenched/prevented near an interface is not necessary. The methods disclosed herein provide gains in efficiency made with respect to the hardware necessary to generate the dead-zone and the initial time required to establish and stabilize said dead-zone. As a result of these advantages (in simplified hardware, cooling methodologies, and build surface regeneration), the methods disclosed herein are able to generate much larger build regions than the competing technology.

Figure 5:
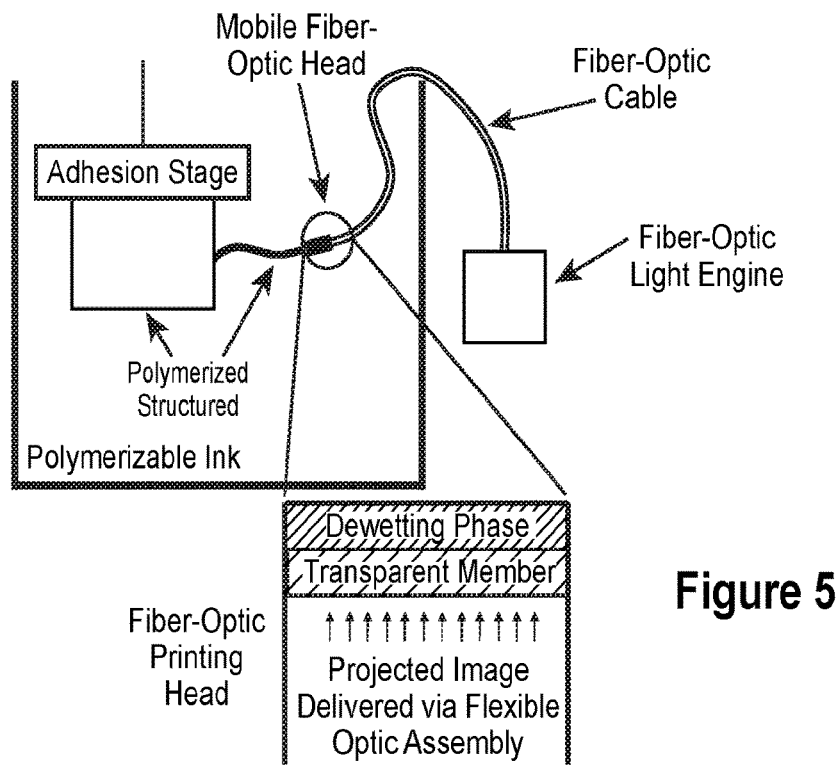
FIG. 5 is a side schematic view of one embodiment of an apparatus useful for carrying out a method as disclosed herein, in particular a transparent member having a dewetting phase thereon provided on the end of a fiber optic cable, the transparent member, dewetting phase, and fiber optic cable provided in the polymerizable liquid, and an adhesion stage.
Figure 6:
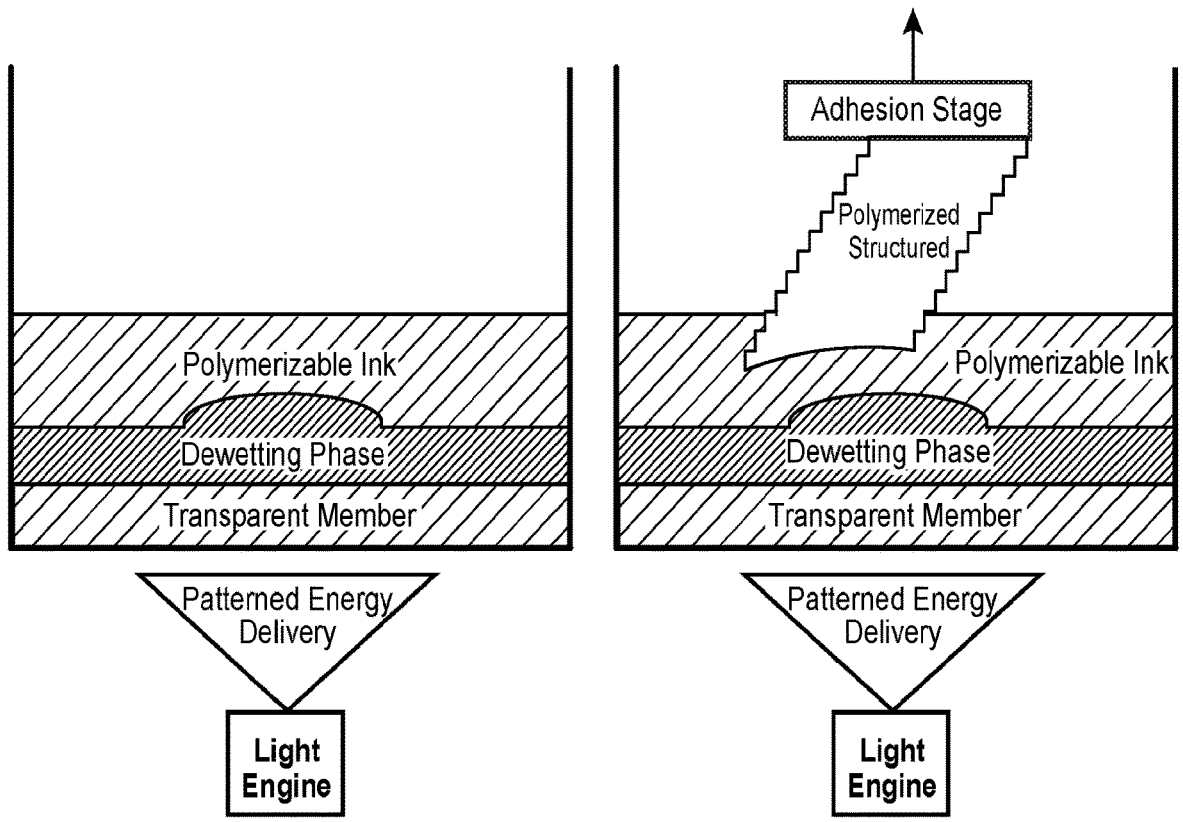
FIG. 6 is a side schematic view of one embodiment of an apparatus useful for carrying out a method as disclosed herein having a curvilinear dewetting phase and a side schematic view of one embodiment of an apparatus having a curvilinear dewetting phase carrying out a method as disclosed herein.

Moreover, as shown in FIG. 5, the phase interfaces can be employed in an omni-directional manner (e.g., a gel-liquid interface can be horizontal, vertical, or at any combination of Euler angles one might wish to print along) in an Euclidian build space. Additionally, as shown in FIG. 6, these interfaces can be generated in curvilinear fashion such that they remain molecularly smooth, but not flat (e.g., a gel can be produced with a radii of curvature to generate a domed or contorted build region). As a result, the methods disclosed herein are not limited by scale, geometry, or directionality of the build region.

Polymerizable Liquids

As used here, "polymerizable liquid" includes any small building blocks which combine to form a larger structure, for example, monomers/oligomers cross-linked through traditional polymer chemistry, small particulate/colloidal matter which binds together, metal ions that deposit to form a bulk metallic, or any other number of chemical to microscale building blocks.

In embodiments, the polymerizable liquid is a separate state of matter (i.e., phase) than the dewetting phase (i.e. a solid dewetting phase with a liquid polymerizable liquid or a pinned gas bubble dewetting phase under a liquid layer of polymerizable liquid). In embodiments, the polymerizable liquid is the same state of matter as the dewetting phase. In embodiments, the polymerizable liquid is a separate state of matter than the mobile phase. In embodiments, the polymerizable liquid is the same state of matter as the mobile phase. The polymerizable liquid is typically immiscible with the dewetting phase and/or the mobile phase.

In embodiments, the polymerizable liquid can include a monomer or oligomer, particularly photopolymerizable and/or free radical polymerizable monomers and oligomers, and a suitable initiator such as a free radical initiator. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968; CN 102715751; JP 2012210408.

In embodiments, the polymerizable liquid comprises an aqueous liquid. In refinements of the foregoing embodiment, the polymerizable liquid comprises a monomer or oligomer selected from the group consisting of acrylics, methacrylics, urethanes, acrylesters, polyesters, cyanoesters, acrylamides, maleic anhydride, functionalized PEGS, dimethacrylate oligomer, and a combination thereof.

In embodiments, the polymerizable liquid comprises an organic liquid. In refinements of the foregoing embodiment, the polymerizable liquid comprises a monomer or oligomer selected from the group consisting of olefins, halogenated olefins, cyclic alkenes, alkenes, alkynes, and a combination thereof. In embodiments, the organic polymerizable liquid is selected from the group consisting of 1,6-hexanediol diacrylate (HDDA), pentaerythritol triacrylate, trimethylolpropane triacrylate (TMPTA), isobornyl acrylate (IBOA), tripropyleneglycol diacrylate (TPGDA), (hydroxyethyl) methacrylate (HEMA), and combinations thereof.

Acid Catalyzed Polymerizable Liquids.

While in embodiments, as noted above, the polymerizable liquid comprises a free radical polymerizable liquid, in other embodiments the polymerizable liquid comprises an acid catalyzed, or cationically polymerized, polymerizable liquid. In such embodiments the polymerizable liquid comprises monomers containing groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocyclic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also *Photoacid Generator Selection Guide for the electronics industry and energy curable coatings* (BASF 2010).

Base Catalyzed Polymerizable Liquids.

In some embodiments the polymerizable liquid comprises a base catalyzed polymerizable liquid. Suitable base catalyzed polymerizable liquids include, but are not limited to, malachite green carbinol base, that produce a hydroxide when irradiated with green light.

Hydrogels.

In embodiments, suitable polymerizable liquids include photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Silicone Resins.

A suitable polymerizable liquid includes silicones. Silicones can be photocurable, or solidified via a Michael reaction between a thiol and a vinyl residue using a radical photo-initiator. Suitable photo-initiators include, but are not limited to, phenylbis(2,4,6-trimethylbenzoyl)phosphine oxide, vinylmethoxysiloxane homopolymer, and (mercaptopropyl)methylsiloxane homopolymer.

Biodegradable Resins.

Biodegradable polymerizable liquids are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable Polyurethanes.

A particularly useful polymerizable liquid is photocurable polyurethanes. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High Performance Resins.

In some embodiments, polymerizable liquids include high performance resins. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluoroenone initiators (including derivatives thereof), to initiate cross-linking on irradiation, as discussed further below.

Additional Example Resins.

Particularly useful resins for polymerizable liquids, for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. A particularly useful resin for investment casting applications includes EnvisionTEC's Easy Cast EC500.

Sol-Gel Polymerizable Liquids.

In some embodiments, the polymerizable liquid may comprise a sol solution, or acid-catalyzed sol. Such solutions generally comprise a metal alkoxide including silicon and titanium alkoxides such as silicon tetraethoxide (tetraethyl ortholsilicate; TEOS) in a suitable solvent. Products with a range of different properties can be so generated, from rubbery materials (e.g., using silane-terminated silicone rubber oligomers) to very rigid materials (glass using only TEOS), and properties in between using TEOS combinations with various silane-terminated oligomers. Additional ingredients such as dyes and dopants may be included in the sol solution as is known in the art, and post-polymerization firing steps may be include as is known in the art. See, e.g., U.S. Pat. Nos. 4,765,818; 7,709,597; 7,108,947; 8,242,299; 8,147,918; 7,368,514.

Additional Resin Ingredients.

In embodiments, the polymerization liquid comprises a particulate or colloidal matter capable of binding together. In embodiments, the polymerization liquid comprises metal ions capable of depositing to form a bulk metallic. The polymerizable liquid resin or material can have solid particles suspended or dispersed therein. Any suitable solid particle can be used, depending upon the end product being fabricated. The particles can be metallic, organic/polymeric, inorganic, ceramic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent, though these may also be provided dissolved solubilized in the liquid resin as discussed below. For example, magnetic or paramagnetic particles or nanoparticles can be employed.

The polymerizable liquid can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

The polymerizable liquid can further comprise one or more additional ingredients dispersed therein, including carbon nanotubes, carbon fiber, and glass filaments.

Polymerizable Liquids Carrying Live Cells.

In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313.

In some embodiments, the polymerizable liquid further comprises a photo-initiator. The photo-initiator used depends on the wavelength of the light source being used. When using a higher energy UV source (i.e., a high pressure mercury lamp with emissions in the region from 200 nm to 400 nm) suitable initiators include, but are not limited to, 4,4'-bis(diethylamino)benzophenone (trade name Irgacure EMK) with a primary absorbance centered around 370 nm, phenylbis(2,4,6-trimethylbenzoyl)phosphine oxide (trade name Irgacure 819) with a primary absorbance centered around 300 nm and a secondary absorbance at 370 nm, diphenyl(2,4,6-trimethylbenzoyl)phosphine oxide (trade name Duracure TPO) with a primary absorbance centered around 380 nm with secondary absorbances at 370 nm and 390 nm, and bis(2,6-difluoro-3-(1-hydropyrrol-1-yl)phenyl) titanocene (trade name Irgacure 784, Omnicure 784) which has a primary absorbance at 300 nm with strong secondary absorbances at 398 nm and 470 nm. See also *Photoinitiators for UV Curing Key Products Selection Guide* 2003 (Ciba Specialty Chemicals 2003).

In embodiments, the photo-initiator is phenylbis(2,4,6-trimethylbenzoyl)phosphine oxide. Without intending to be bound by theory it is believed that at a concentration of 0.5% wt, despite the lower solubility of phenylbis(2,4,6-trimethylbenzoyl)phosphine oxide, the overall absorption coefficient and active wavelengths make it the most versatile of the initiators. Further, owing to its secondary absorbance at 370 nm (which is sufficiently broad to extend into the visible domain), phenylbis(2,4,6-trimethylbenzoyl)phosphine oxide can be readily polymerized via a UV source (mercury lamp), a UV-blue LED (centered at 405 nm), a standard off-the-shelf DLP computer projector, and ambient fluorescent lighting.

Further, owing to its secondary absorbance at 370 nm (which is sufficiently broad to extend into the visible domain), phenylbis(2,4,6-trimethylbenzoyl)phosphine oxide can be readily polymerized via a UV source (mercury lamp), a UV-blue LED (centered at 405 nm), a standard off-the-shelf DLP computer projector, and ambient fluorescent lighting.

In some embodiments, the photo-initiator is bis(2,6-difluoro-3-(1-hydropyrrol-1-yl)phenyl)titanocene (trade name Irgacure 784, Omnicure 784) which has a primary absorbance at 300 nm with strong secondary absorbances at 398 nm and 470 nm. Without intending to be bound by theory, bis(2,6-difluoro-3-(1-hydropyrrol-1-yl)phenyl)titanocene allows for the polymerizable liquid to be cured using visible light (blue through green sources) and a number of other light sources (such as commercially available LED backlit LCD displays).

In some embodiments, the polymerizable liquid further comprises a surfactant. A surfactant can be included in the polymerizable liquid to reduce the interfacial surface tension between the polymerizable liquid and the dewetting phase and/or the mobile phase. Exemplary surfactants include, but are not limited to, partially fluorinated acrylic polymers (such as Capstone FS-22 and Capstone FS-83 from DuPont (Wilmington, Del.)), ionic surfactants, including but not limited to CTAB (hexadecyltrimethylammonium bromide), CPC (cetylpyridinium chloride), DOAB (dimethyldioctadecylammonium bromide), SDS (sodium dodecyl sulfonate), SDBS (Sodium dodecylbenzenesulfonate), and non-ionic surfactants, including but not limited to hexaethylene glycol mono-n-dodecyl ether (C12EO6), polyoxyethylene (2) sorbitan monolaurate (Tween-20; Polysorbate 20), and Tyloxapol.

Mobile Phase

The mobile phase can be any material that is immiscible and/or insoluble with the polymerizable liquid and is moving during polymerization. In embodiments, the mobile phase is a dewetting phase, as described herein. The movement of the mobile phase can be described relative to the emerging object comprising solidified polymerized material and/or relative to the energy source responsible for solidifying the polymerization liquid. In embodiments, the mobile phase moves in a plane, wherein the emerging object and/or energy source are substantially normal to said plane (e.g., the mobile phase moves monodirectionally, perpendicular to the advancing of the adhesion stage, or the mobile phase moves rotationally, perpendicular to the advancing of the adhesion stage). In embodiments, the mobile phase moves in a plane, wherein the emerging object and/or energy source would be substantially normal to said plane, and the emerging object and energy source are also in motion (e.g., the emerging object and light engine rotate on a common axis, while the mobile phase moves laterally relative to the object, wherein the rotational axis is normal to the mobile phase plane).

In embodiments, the mobile phase comprises a moving solid phase, a moving gel phase, a flowing fluid, or a combination thereof. In some cases, the mobile phase comprises a moving solid. In some cases, the mobile phase comprises a moving gel. In some cases, the mobile phase comprises a flowing fluid. In some cases, the mobile phase comprises the combination of a moving solid phase and a flowing liquid.

The mobile phase can comprise a moving solid phase selected from the group consisting of an organic solid, an aqueous solid, a per-fluorinated solid, and a combination thereof. Organic solids can include, but are not limited to, squalane, squalene, solid hexadecane, and a combination thereof. Aqueous solids can include, but are not limited to ice, solid tetraethylene glycol, solid PEG-300 (i.e., a polyethylene glycol having a molecular weight of 300 Da), solid PEG-400, solid PEG-600, solid higher molecular weight PEGs, and combinations thereof. Per-fluorinated solids can include, but are not limited to, perfluoropolyether, fluorinated ethylene propylene, polytetrafluoroethylene, and combinations thereof. A solid mobile phase can move relative to the emerging object by, e.g., use of a conveyor.

The mobile phase can comprise a moving gel phase selected from the group consisting of organo-gel, silicone-gel, aqueous hydro-gel, fluoro-gel, and a combination thereof. Aqueous hydro-gels can include, but are not limited to, agar, agarose gels, polyacrylamide gels, starch gels, cationic gels, anionic gels, and combinations thereof. Fluoro-gels can include, but are not limited to 2-(perfluorohexyl)ethyl acrylates swelled with perfluoropolyether.

The mobile phase can comprise a flowing fluid. Examples of flowing fluids include an aqueous liquid, an organic liquid, a silicone liquid and a fluoro liquid. Aqueous liquids can include, but are not limited to, water, deuterium oxide, densified salt solutions, densified sugar solutions, and combinations thereof. Example salts and their solubility limit in water at approximately room temperature include NaCl 35.9 g/100 ml, NaBr 90.5 g/100 ml, KBr 67.8 g/100 ml, MgBr$_2$ 102 g/100 ml, MgCl$_2$ 54.3 g/100 ml, sodium acetate 46.4 g/100 ml, sodium nitrate 91.2 g/100 ml, CaBr$_2$ 143 g/100 ml, CaCl$_2$ 74.5 g/100 ml, Na$_2$CO$_3$ 21.5 g/100 ml, NH$_4$Br 78.3 g/100 ml, LiBr 166.7 g/100 ml, KI 34.0 g/100 ml, and NaOH 109 g/100 ml. Thus, for example, a 100 ml solution of 35.9 g NaCl has a density of 1204 kg/m$^3$. Example sugars and their solubility limit in water at approximately room temperature include sucrose 200 g/ml, maltose 108 g/100 ml, and glucose 90 g/100 ml. Thus, for example, a 60% sucrose water solution has a density of 1290 kg/m$^3$ at room temperature. Silicone liquids can include, but are not limited to silicone oils. Silicone oils are liquid polymerized siloxanes with organic side chains. Examples of silicone oils include polydimethylsiloxane (PDMS), simethicone, and cyclosiloxanes. Fluoro liquids can include, but are not limited to, fluorinated oils. Fluorinated oils generally include liquid perfluorinated organic compounds. Examples of fluorinated oils include perfluoro-n-alkanes, perfluoropolyethers, perfluoralkylethers, co-polymers of substantially fluorinated molecules, and combinations of the foregoing. Organic liquids can include, but are not limited to, organic oils, organic solvents, including but not limited to chlorinated solvents (e.g., dichloromethane, dichloroethane and chloroform), and organic liquids immiscible with aqueous systems. Organic oils include neutral, nonpolar organic compounds that are viscous liquids at ambient temperatures and are both hydrophobic and lipophilic. Examples of organic oils include, but are not limited to higher density hydrocarbon liquids. In embodiments, the mobile phase comprises a silicone liquid, a fluoro liquid, or a combination thereof.

Figure 13:
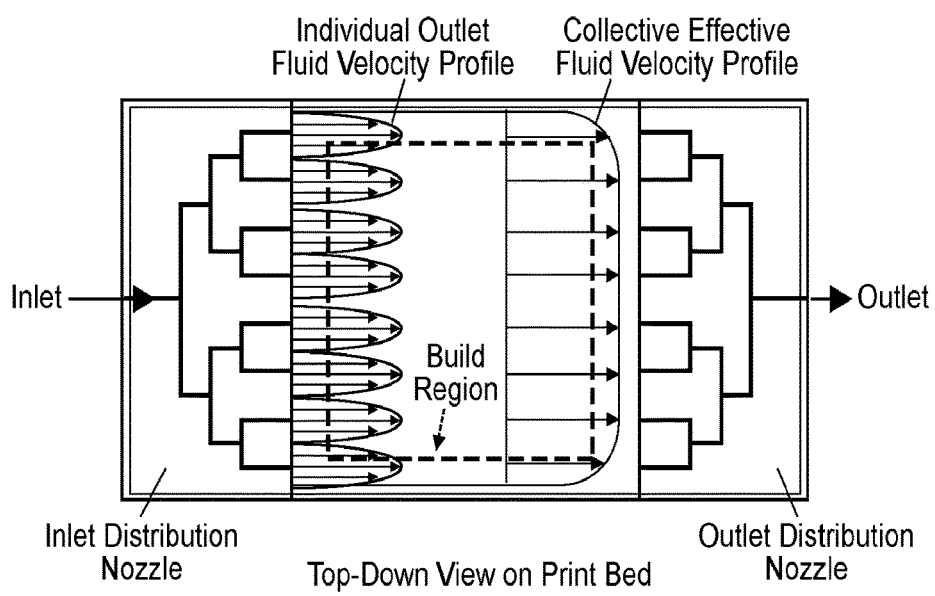
FIG. 13 is a top down view on how isobaric distribution nozzles generate a uniform flow profile of flowing fluid mobile phase across the transparent member.

The flow of the mobile phase can be at a rate to remain in the laminar flow regime, to avoid interfacial turbulence, while generating a shear-flow profile between the polymerizable liquid phase and the mobile phase. When the mobile phase is a flowing fluid, generation of a laminar flow profile can be facilitated by using distribution nozzles which generate a series of evenly spaced isobaric mobile phase outlets and inlets form a single high-flow inlet and outlet (e.g., as shown in FIG. 13).

In some cases, the mobile phase may be recirculated through a closed loop. In some cases, the mobile phase moves from a first, mobile phase supply reservoir to a second, mobile phase capture reservoir and is not recirculated through a closed loop. The mobile phase can be collected from the second reservoir, optionally filtered, cleaned, and/or decontaminated, and returned back to the first supply reservoir for reuse. The mobile phase can be collected from the second reservoir, optionally filtered, cleaned, and/or decontaminated, and the flow direction reversed so as to return the mobile phase to the first reservoir.

Optionally, the mobile phase is optically transparent. As used herein, unless specified otherwise, "optically transparent" means the optically transparent element allows from 1% to 100% transmittance of the energetic event initiating solidification of the polymerizable liquid. In some cases, at least 40%, at least 50%, at least 60%, at least 70%, at least 80%, or at least 90% of the energetic event is transmitted through the optically transparent element. An optically transparent element can allow transmittance of a broad range of wavelengths, including, but not limited to, wavelengths corresponding to X-Ray radiation, ultraviolet (UV) light radiation, visible light radiation, infrared (IR) radiation, and microwave radiation.

The mobile phase can further include a surfactant. A surfactant can be included in mobile phase to reduce the interfacial surface tension between the polymerizable liquid and the mobile phase. Exemplary surfactants include, but are not limited to, partially fluorinated acrylic polymers (such as Capstone FS-22 and Capstone FS-83 from DuPont (Wilmington, Del.)), ionic surfactants, including but not limited to CTAB (hexadecyltrimethylammonium bromide), CPC (cetylpyridinium chloride), DOAB (dimethyldioctadecylammonium bromide), SDS (sodium dodecyl sulfonate), SDBS (Sodium dodecylbenzenesulfonate), and non-ionic surfactants, including but not limited to hexaethylene glycol mono-n-dodecyl ether (C12EO6), polyoxyethylene (2) sorbitan monolaurate (Tween-20; Polysorbate 20), and Tyloxapol.

Dewetting Phase

Aspects of the methods disclosed herein rely upon the use of a phase boundary as a build region that can be molecularly smooth due to interfacial surface tension of the dewetting phase and the polymerizable liquid that together constitute the interfacial system. The dewetting phase and the polymerizable liquid are generally immiscible. In embodiments, the dewetting phase and polymerizable liquid are "de-wetting" allowing for polymerization to occur without strong adhesive forces between the solidified polymer and the underlying phase. In embodiments, the dewetting phase can be a mobile phase, allowing for polymerization to occur without strong adhesive forces between the solidified polymer and the underlying phase. As a result of these low forces, the solidified 'printed' material can be easily lifted off of the surface in a continuous manner. In embodiments, the dewetting phase and the polymerizable liquid have a contact angle of greater than 60°, or greater than 90° when the polymerizable liquid and/or dewetting phase is substantially free of surfactant. In embodiments, the dewetting phase and the polymerizable liquid phase have a contact angle of greater than 60°, when the polymerizable liquid is substantially free of surfactant. As used herein, unless specified otherwise, "substantially free of surfactant" refers to a concentration of surfactant of less than about 500 ppm, less than about 250 ppm, less than about 100 ppm, or less than about 50 ppm, or less than about 10 ppm.

Figure 8:
FIG. 8 is a diagram of the phase interface and the dewetting angles for a three phase system.

As used herein, "dewetting" means that is the phases repel one another and have a contact angle, $\theta$, above 60°, or above 90°. A contact angle of zero degrees indicates perfectly wetting properties; a contact angle between zero and ninety degrees generally indicates high wetting properties; a contact angle between ninety and one hundred and eighty degrees generally indicates low wetting properties; a contact angle of 180 degrees indicates perfectly non-wetting properties. It is not required that perfect dewetting be achieved, and some lower wettability combinations may be satisfactory in some circumstances, but it is generally preferred that the contact angle between the polymerizable liquid and dewetting phase, during the polymerization steps, be greater than 60° be achieved. If such dewetting is not inherently achieved by the particular combination of polymerizable liquid and dewetting phase, wettability between the two liquids can be decreased by the inclusion of one or more surfactants, co-solvents, pH or temperature so as to change the surface tension of the polymerizable liquid and the contact angle at the phase interface. It should be noted that contact angles are generally defined for solid-liquid-gas interfaces. Thus, wetting is usually defined for a combination of a solid, a liquid, and a gas (when a gas phase is not specified, it is taken to be air at standard temperature and pressure). Further, it should be noted that just because one phase is a solid, it does not necessarily mean that that phase will support the weight of the second phase and it could be deformed as a result of that weight. For example, when considering the arrangement shown in FIG. 8, when the bottom phase is not a rigid solid, $\beta$ does not have to be 180°. As a result, it can be more tractable to define the three phase-interface in terms of $\alpha$, as opposed to $\theta$. When $\beta$ is not equal to 180°, a dewetting interface can be defined as an interface having a value of $\alpha$ of less than 90°, as this dewetting angle has a lower dependence on the deformation of the $\beta$ phase.

Further, contact angles can be defined between two liquids on a solid interface (e.g., a submerged droplet) which is often the case where one is looking at submerged surfaces. As a result the contact angle is described in terms of all three phases (such as a droplet of chloroform sitting on a surface which is submerged in water).

Without intending to be bound by theory, it is believed that in embodiments wherein the dewetting phase is a mobile phase, the dewetting phase and the polymerizable liquid can have higher wetting properties (e.g., a contact angle of less than 90°, e.g., about 60°), when the dewetting phase and the polymerizable liquid are substantially free of surfactant, because the flowing of the dewetting phase provides reduced adhesive forces, which compensates for the higher wettability.

Because the methods of the disclosure allow for polymerization to occur without strong adhesive forces between the solidified polymer and the underlying dewetting and/or mobile phase, the polymerizable liquid does not require a dead zone or inhibition zone. Accordingly, in embodiments, the polymerization liquid does not include a dead zone. Further, because the methods of the disclosure can employ a dewetting phase that is not a liquid, interfaces can advantageously be employed in an omni-directional manner and/or interfaces can be generated in curvilinear fashion such that they remain molecularly smooth, but not flat. Thus, in embodiments, the dewetting phase is curvilinear. In embodiments, the build surface is not textured.

In embodiments, the dewetting phase comprises a gel. In embodiments, the dewetting phase is a gel selected from the group consisting of an organo-gel, a silicone-gel, an aqueous hydro-gel, a fluoro-gel, and a combination thereof. In refinements of the foregoing embodiment, the dewetting phase is an aqueous hydro-gel and the aqueous hydro-gel is selected from the group consisting of agar, agarose gels, polyacrylamide gels, starch gels, cationic gels, anionic gels, and combinations thereof. In refinements, the dewetting phase is a fluoro-gel and the fluoro-gel comprises 2-(perfluoroheyxl)ethyl acrylate swelled with perfluoropolyether.

In embodiments, the dewetting phase comprises a solid. In embodiments, the dewetting phase is a solid and the solid is selected from the group consisting of an organic solid, an aqueous solid, a per-fluorinated solid, and a combination thereof. In refinements of the foregoing embodiment, the dewetting phase is an organic solid and the organic solid is selected from the group consisting squalane, squalene, solid hexadecane, and a combination thereof. In refinements, the dewetting phase is an aqueous solid and the aqueous solid is selected from the group consisting of ice, solid tetraethylene glycol, solid PEG-300, solid PEG-400, solid PEG-600, and combinations thereof. In refinements, the dewetting phase is a per-fluorinated solid and the per-fluorinated solid comprises a solid perfluoropolyether.

In embodiments, the dewetting phase comprises a gas.

In embodiments, the dewetting phase comprises a liquid. The liquid dewetting phase can include an aqueous based liquid, an organic based liquid, a silicone based liquid, a fluorinated based liquid, and a combination thereof. In embodiments, the liquid dewetting phase comprises a silicone based liquid, a fluorinated based liquid, or a combination thereof. Fluorinated based liquids can include, but are not limited to, perfluoro-n-alkanes, perfluoropolyethers, perfluoralkylethers, co-polymers of substantially fluorinated molecules, and combinations of the foregoing.

In some embodiments, the dewetting phase further comprises a surfactant. A surfactant can be included in the dewetting phase to reduce the interfacial surface tension between the polymerizable liquid and the dewetting phase. Exemplary surfactants include, but are not limited to, partially fluorinated acrylic polymers (such as Capstone FS-22 and Capstone FS-83 from DuPont (Wilmington, Del.)), ionic surfactants, including but not limited to CTAB (hexadecyltrimethylammonium bromide), CPC (cetylpyridinium chloride), DOAB (dimethyldioctadecylammonium bromide), SDS (sodium dodecyl sulfonate), SDBS (Sodium dodecylbenzenesulfonate), and non-ionic surfactants, including but not limited to hexaethylene glycol mono-n-dodecyl ether (C12EO6), polyoxyethylene (2) sorbitan monolaurate (Tween-20; Polysorbate 20), and Tyloxapol.

In embodiments, the dewetting phase is optically transparent.

Polymerization Initiator/Energy Source

Fabrication of the three-dimensional object from the polymerizable liquid requires an initiation event which induces solidification or deposition from the polymerizable liquid. The deposition can be, for example, light activated, electrically activated, thermally activated, and/or magnetically activated. In embodiments, polymerization is performed by electromagnetic irradiation. In embodiments, polymerization is performed by electricity. In embodiments, polymerization is performed by thermal activation. In embodiments, polymerization is performed by magnetic activation.

Figure 7:
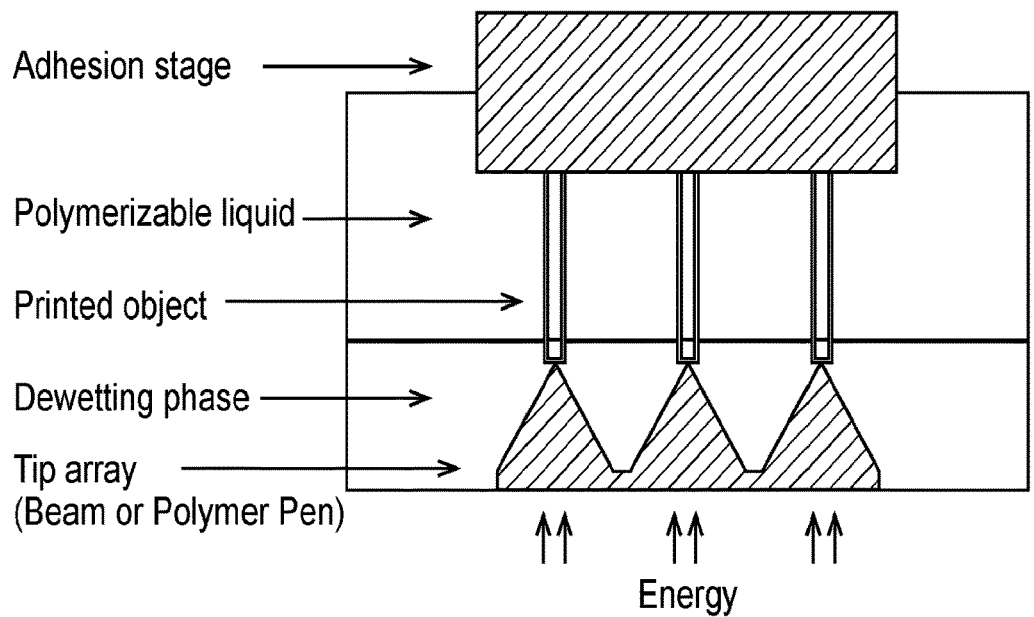
FIG. 7 is a side schematic view of one embodiment of an apparatus useful for carrying out a method as disclosed herein, in particular by using a beam pen lithography or polymer pen lithography tip array.

In embodiments, the method is performed in parallel using a multi-tip array and the tip of the multi-tip array comprises the member. The multi-tip array can be from a Beam Pen Lithography system and/or from a Polymer Pen Lithography system. A schematic of these embodiments is shown in FIG. 7.

Beam-Pen Lithography

In embodiments, the multi-tip array is part of a beam pen lithography system. Beam Pen Lithography (BPL) is described in, for example, U.S. Pat. No. 9,021,611, herein incorporated by reference in its entirety. BPL can allow for patterning of sub-micron features over large areas with flexible pattern design, convenient, selective pen tip addressability, and low fabrication cost. As compared to conventional photolithography or contact printing in which only pre-formed patterns (i.e. photomasks) can be duplicated, BPL can provide the flexibility to create different patterns by controlling the movement of a tip array over the substrate and/or by selectively illuminating one or more of the pen tips in the tip array (e.g., selectively allowing energy to pass through one or more of the pen tips in the tip array to initiate polymerization of the polymerizable liquid). Thus, multiple objects, for example, can be fabricated in a parallel fashion.

A BPL tip array includes a tip substrate layer and a plurality of tips fixed to the tip substrate layer. The tip substrate layer and the plurality of tips are formed of a transparent polymer. The tip substrate layer and the tips can be formed of the same polymer or can be formed of different polymers. The tip array further includes a blocking layer coated on the sidewalls of the tips and on the portions of the tip substrate layer between adjacent tips. An aperture is defined in the blocking layer at the tip end (e.g., the photosensitive layer-contacting end of each of the tips), such that the transparent polymer tip end is exposed through the aperture.

The tip substrate layer can be attached to a transparent (e.g., optically transparent) rigid support, for example, formed from glass, silicon, quartz, ceramic, polymer, or any combination thereof. The rigid support is preferably highly rigid and has a highly planar surface upon which to mount the tip array.

The tip arrays are non-cantilevered and comprise tips which can be designed to have any shape or spacing (pitch) between them, as needed. The shape of each tip can be the same or different from other tips of the array, and preferably the tips have a common shape. Contemplated tip shapes include spheroid, hemispheroid, toroid, polyhedron, cone, cylinder, and pyramid (trigonal or square). The tips have a base portion fixed to the tip substrate layer. The base portion preferably is larger than the tip end portion. The base portion can have an edge length in a range of about 1 µm to about 50 µm, or about 5 µm to about 50 µm. A preferred tip array contains thousands of tips, preferably having a pyramidal shape. The substrate-contacting (tip end) portions of the tips each can have a diameter in a range of about 50 nm to about 1 µm. The substrate-contacting portions of the tips are preferably sharp, so that each is suitable for forming sub-micron patterns, e.g., less than about 500 nm. The sharpness of the tip is measured by its radius of curvature. The tips can have a radius of curvature, for example, of below about 1 μm. The tip-to-tip spacing between adjacent tips (tip pitch) can be in a range of about 1 μm to about over 10 mm.

The blocking layer on the polymer tip sidewalls serves as a radiation blocking layer, allowing the radiation illuminated on a surface of the substrate layer opposite the surface to which the tips are fixed to be emitted only through the tip end exposed by the aperture defined in the blocking layer. The exposure of a substrate pre-coated with a resist layer with the radiation channeled through the tip ends of the tip array can allow for polymerization of the polymerizable liquid at each tip end. The blocking layer can be formed of any material suitable for blocking (e.g., reflecting) a type of radiation used in the lithography process. For example, the blocking layer can be a metal, such as gold, when used with UV light. Other suitable blocking layers include, but are not limited to, gold, chromium, titanium, silver, copper, nickel, silicon, aluminum, opaque organic molecules and polymers, and combinations thereof. The blocking layer can have any suitable thickness, for example in a range of about 40 nm to about 500 nm.

Polymeric materials suitable for use in the tip array can have linear or branched backbones, and can be crosslinked or non-crosslinked, depending upon the particular polymer and the degree of compressibility desired for the tip. Cross-linkers refer to multi-functional monomers capable of forming two or more covalent bonds between polymer molecules. Non-limiting examples of cross-linkers include such as trimethylolpropane trimethacrylate (TMPTMA), divinyl-benzene, di-epoxies, tri-epoxies, tetra-epoxies, di-vinyl ethers, tri-vinyl ethers, tetra-vinyl ethers, and combinations thereof.

Thermoplastic or thermosetting polymers can be used, as can crosslinked elastomers. In general, the polymers can be porous and/or amorphous. A variety of elastomeric polymeric materials is contemplated, including polymers of the general classes of silicone polymers and epoxy polymers. Polymers having low glass transition temperatures such as, for example, below 25° C. or more preferably below −50° C., can be used. Diglycidyl ethers of bisphenol A can be used, in addition to compounds based on aromatic amine, triazine, and cycloaliphatic backbones. Another example includes Novolac polymers. Other contemplated elastomeric polymers include methylchlorosilanes, ethylchlorosilanes, and phenylchlorosilanes, polydimethylsiloxane (PDMS). Other materials include polyethylene, polystyrene, polyb-utadiene, polyurethane, polyisoprene, polyacrylic rubber, fluorosilicone rubber, and fluoroelastomers.

Further examples of suitable polymers that may be used to form a tip can be found in U.S. Pat. Nos. 5,776,748; 6,596,346; and 6,500,549, each of which is hereby incorporated by reference in its entirety. Other suitable polymers include those disclosed by He et al., *Langmuir* 2003, 19, 6982-6986; Donzel et al., *Adv. Mater.* 2001, 13, 1164-1167; and Martin et al., *Langmuir,* 1998, 14-15, 3791-3795. Hydrophobic polymers such as polydimethylsiloxane can be modified either chemically or physically by, for example, exposure to a solution of a strong oxidizer or to an oxygen plasma.

The polymer of the tip array can be a polymer gel. The gel polymer can comprise any suitable gel, including hydrogels and organo-gels. For example, the polymer gel can be a silicon hydrogel, a branched polysaccharide gel, an unbranched polysaccharide gel, a polyacrylamide gel, a polyethylene oxide gel, a cross-linked polyethylene oxide gel, a poly(2-acrylamido-2-methyl-1-propanesulfonic acid) (polyAMPS) gel, a polyvinylpyrrolidone gel, a cross-linked polyvinylpyrrolidone gel, a methylcellulose gel, a hyaluronan gel, and combinations thereof. For example, the polymer gel can be an agarose gel. By weight, gels are mostly liquid, for example the gel can be greater than 95% liquid, yet behave like a solid due to the presence of a cross-linked network within the liquid.

The material used to form the tip array has a suitable compression modulus and surface hardness to prevent collapse of the tip during contact with the surface, but too high a modulus and too great a surface hardness can lead to a brittle material that cannot adapt and conform to a substrate surface during exposure. As disclosed in Schmid, et al., *Macromolecules,* 33:3042 (2000), vinyl and hydrosilane prepolymers can be tailored to provide polymers of different modulus and surface hardness. Thus, in another type of embodiment, the polymer can be a mixture of vinyl and hydrosilane prepolymers, wherein the weight ratio of vinyl prepolymer to hydrosilane crosslinker is about 5:1 to about 20:1.

The tip array and/or the build region can be moved during patterning to form the desired object. For example, in one embodiment, the tip array is moved while the build region is held stationary. In another embodiment, the tip array is held stationary while the build region is moved. In yet another embodiment, both the tip array and the build region are moved.

When using large-scale 2D arrays of BPL tips (15,000 pens per cm$^2$), BPL can be used to do very high throughput lithography, yielding thousands of parallel-produced 3D objects at a time. The objects can be the same, for example by using a uniform tip array. In the alternative, at least some of the objects can differ from each other, for example by using a tip array which is non-uniformly masked and lateral displacement of the tip array while printing which exceeds the tip pitch dimension.

Another factor contributing to BPL resolution is the tip aperture size, which controls the area exposed to light from the tip. With a near UV light or halogen light source and conventional photolithography conditions, objects close to and below the light diffraction limit, of about 200 nm can be created.

Large arrays of objects can be made simultaneously by moving the array of the surface while illuminating the tip array from the back side of the tips, for example, through the tip substrate layer. The radiation can be kept on during the entire process.

The individual tips within a BPL array can be addressed by selective illumination. For example, fewer than all of the tips in the array can be illuminated, for example one or a selected plurality of the tips in the tip array. Selective illumination of the tips can be performed, for example, by selectively focusing light through the bases of each tip. The tip array can also include one or more spatial light modulators capable of blocking certain tips from exposure to the light. The spatial light modulators can be static and/or dynamically controllable. For example, the spatial light modulates can be shutters. The spatial light modulators can be formed using a variety of materials, including, for example, liquid crystals. The spatial light modulators can be, for example, a mask, which is not dynamically controllable. The spatial light modulators can be placed or formed as a part of the tip substrate layer.

Polymer Pen Lithography

In embodiments, the multi-tip array is part of a polymer pen lithography system. Polymer Pen Lithography is a direct-write method that delivers collections of molecules in a positive printing mode. Polymer Pen Lithography utilizes elastomeric tips without cantilevers. The tips are preferably made of polydimethylsiloxane, PDMS. A preferred polymer pen array contains thousands of tips, preferably having a pyramidal shape, which can be made with a master prepared by conventional photolithography and subsequent wet chemical etching. The tips preferably are connected by a common substrate which includes a thin polymer backing layer (50-100 µm thick), which preferably is adhered to a rigid support (e.g., a glass, silicon, quartz, ceramic, polymer, or any combination thereof), e.g. prior to or via curing of the polymer. The rigid support is preferably highly rigid and has a highly planar surface upon which to mount the array (e.g., silica glass, quartz, and the like). The rigid support and thin backing layer significantly improve the uniformity of the polymer pen array over large areas, such as three inch wafer surface, and make possible the leveling and uniform, controlled use of the array. Polymer pen tip arrays are disclosed in, e.g., WO 2009/132321, the disclosure of which is incorporated by reference in its entirety herein.

In embodiments, one or more of the array tips, backing layer, and rigid support are at least translucent, and preferably transparent.

The tip arrays are non-cantilevered and comprise tips which can be designed to have any shape or spacing between them, as needed. The shape of each tip can be the same or different from other tips of the array. Contemplated tip shapes include spheroid, hemispheroid, toroid, polyhedron, cone, cylinder, and pyramid (trigonal or square). The sharpness of the tip is measured by its radius of curvature, and the radius of curvature of the tips disclosed herein is below 1 µm. The tip array can be formed from a mold made using photolithography methods, which is then used to fashion the tip array using a polymer as disclosed herein. The mold can be engineered to contain as many tips arrayed in any fashion desired. The tips of the tip array can be any number desired, and contemplated numbers of tips include about 1000 tips to about 15 million tips, or greater.

The polymers can be any polymer having a compressibility compatible with the lithographic methods. Polymeric materials suitable for use in the tip array can have linear or branched backbones, and can be crosslinked or non-crosslinked, depending upon the particular polymer and the degree of compressibility desired for the tip. Cross-linkers refer to multi-functional monomers capable of forming two or more covalent bonds between polymer molecules. Non-limiting examples of cross-linkers include such as trimethylolpropane trimethacrylate (TMPTMA), divinylbenzene, di-epoxies, tri-epoxies, tetra-epoxies, di-vinyl ethers, tri-vinyl ethers, tetra-vinyl ethers, and combinations thereof.

Thermoplastic or thermosetting polymers can be used, as can crosslinked elastomers. In general, the polymers can be porous and/or amorphous. A variety of elastomeric polymeric materials is contemplated, including polymers of the general classes of silicone polymers and epoxy polymers. Polymers having low glass transition temperatures such as, for example, below 25° C. or more preferably below −50° C., can be used. Diglycidyl ethers of bisphenol A can be used, in addition to compounds based on aromatic amine, triazine, and cycloaliphatic backbones. Another example includes Novolac polymers. Other contemplated elastomeric polymers include methylchlorosilanes, ethylchlorosilanes, and phenylchlorosilanes, polydimethylsiloxane (PDMS). Other materials include polyethylene, polystyrene, polybutadiene, polyurethane, polyisoprene, polyacrylic rubber, fluorosilicone rubber, and fluoroelastomers.

Further examples of suitable polymers that may be used to form a tip can be found in U.S. Pat. Nos. 5,776,748; 6,596,346; and 6,500,549, each of which is hereby incorporated by reference in its entirety. Other suitable polymers include those disclosed by He et al., *Langmuir* 2003, 19, 6982-6986; Donzel et al., *Adv. Mater.* 2001, 13, 1164-1167; and Martin et al., *Langmuir*, 1998, 14-15, 3791-3795. Hydrophobic polymers such as polydimethylsiloxane can be modified either chemically or physically by, for example, exposure to a solution of a strong oxidizer or to an oxygen plasma.

The material used to form the tip array has a suitable compression modulus and surface hardness to prevent collapse of the tip during contact with the surface, but too high a modulus and too great a surface hardness can lead to a brittle material that cannot adapt and conform to a substrate surface during exposure. As disclosed in Schmid, et al., *Macromolecules*, 33:3042 (2000), vinyl and hydrosilane prepolymers can be tailored to provide polymers of different modulus and surface hardness. Thus, in another type of embodiment, the polymer can be a mixture of vinyl and hydrosilane prepolymers, wherein the weight ratio of vinyl prepolymer to hydrosilane crosslinker is about 5:1 to about 20:1.

The material used to form the tip array preferably will have a surface hardness of about 0.2% to about 3.5% of glass, as measured by resistance of a surface to penetration by a hard sphere with a diameter of 1 mm, compared to the resistance of a glass surface (as described in Schmid, et al., *Macromolecules*, 33:3042 (2000) at p 3044). The surface hardness optionally can be about 0.3% to about 3.3%, about 0.4% to about 3.2%, about 0.5% to about 3.0%, or about 0.7% to about 2.7% of glass. The polymers of the tip array can have a compression modulus of about 10 MPa to about 300 MPa. The tip array preferably comprises a compressible polymer which is Hookean under pressures of about 10 MPa to about 300 MPa. The linear relationship between pressure exerted on the tip array and the feature size allows for control of the near field and feature size using the disclosed methods and tip array.

The tip array can comprise a plurality of tips fixed to a common substrate and formed from a polymer as disclosed herein. The tips can be arranged randomly or in a regular periodic pattern (e.g., in columns and rows, in a circular pattern, or the like). The tips can all have the same shape or be constructed to have different shapes. The common substrate can comprise an elastomeric layer, which can comprise the same polymer that forms the tips of the tip array, or can comprise an elastomeric polymer that is different from that of the tip array. The elastomeric layer can have a thickness of about 50 µm to about 100 µm. The tip array can be affixed or adhered to a rigid support (e.g., glass, such as a glass slide). In various cases, the common substrate, the tip array, and/or the rigid support, if present, is translucent or transparent. In a specific case, each is translucent or transparent.

Methods of Forming 3D Objects

Figure 2:
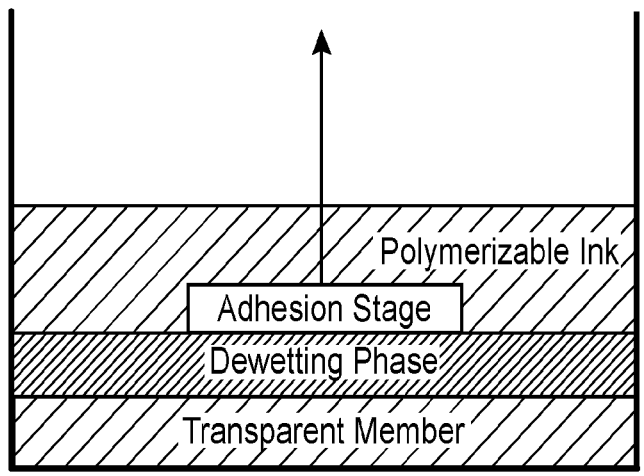
FIG. 2 is a side schematic view of one embodiment of an apparatus carrying out a method as disclosed herein, in particular an apparatus having a transparent member, a dewetting phase provided on the transparent member, a polymerizable liquid provided on the dewetting phase, and an adhesion stage.
Figure 3:
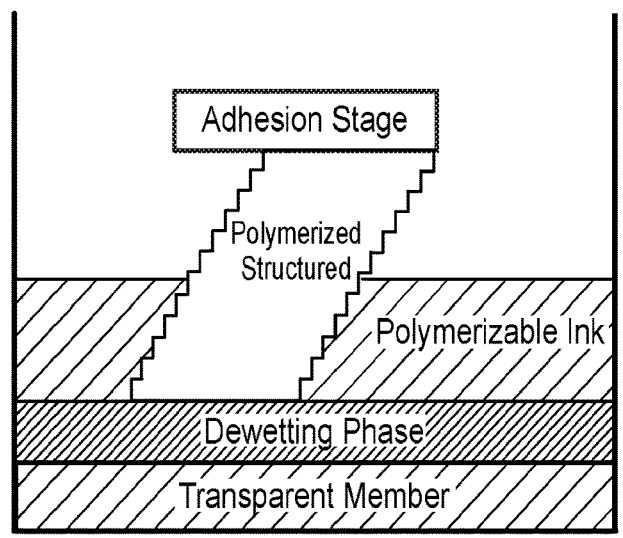
FIG. 3 is a side schematic view of one embodiment of an apparatus carrying out continuous polymerization.
Figure 9:
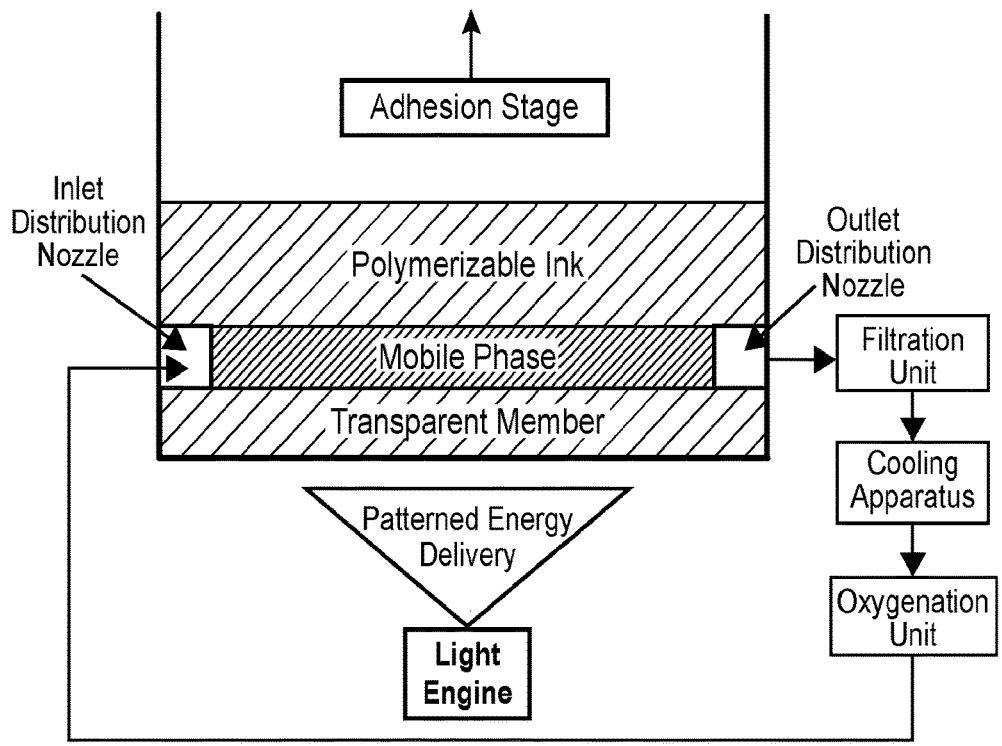
FIG. 9 is a side schematic view of one embodiment of an apparatus useful for carrying out a method as disclosed herein, in particular an apparatus having a transparent member, a mobile phase provided on the transparent member, a polymerizable liquid provided on the mobile phase, and an adhesion stage, wherein the mobile phase is recirculated through a closed loop optionally including a filtration unit, cooling apparatus, and oxygenation unit.
Figure 10:
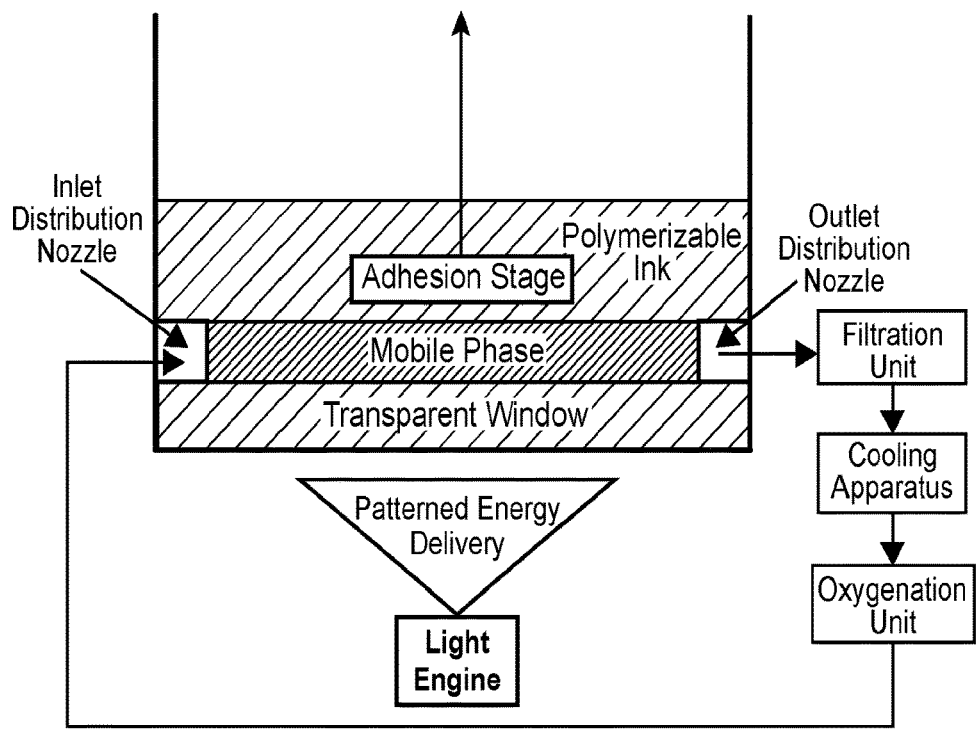
FIG. 10 is a side schematic view of one embodiment of an apparatus carrying out a method as disclosed herein, in particular an apparatus having a transparent member, a mobile phase provided on the transparent member, a polymerizable liquid provided on the mobile phase, and an adhesion stage, wherein the mobile phase is recirculated through a closed loop optionally including a filtration unit, cooling apparatus, and oxygenation unit (all shown).
Figure 11:
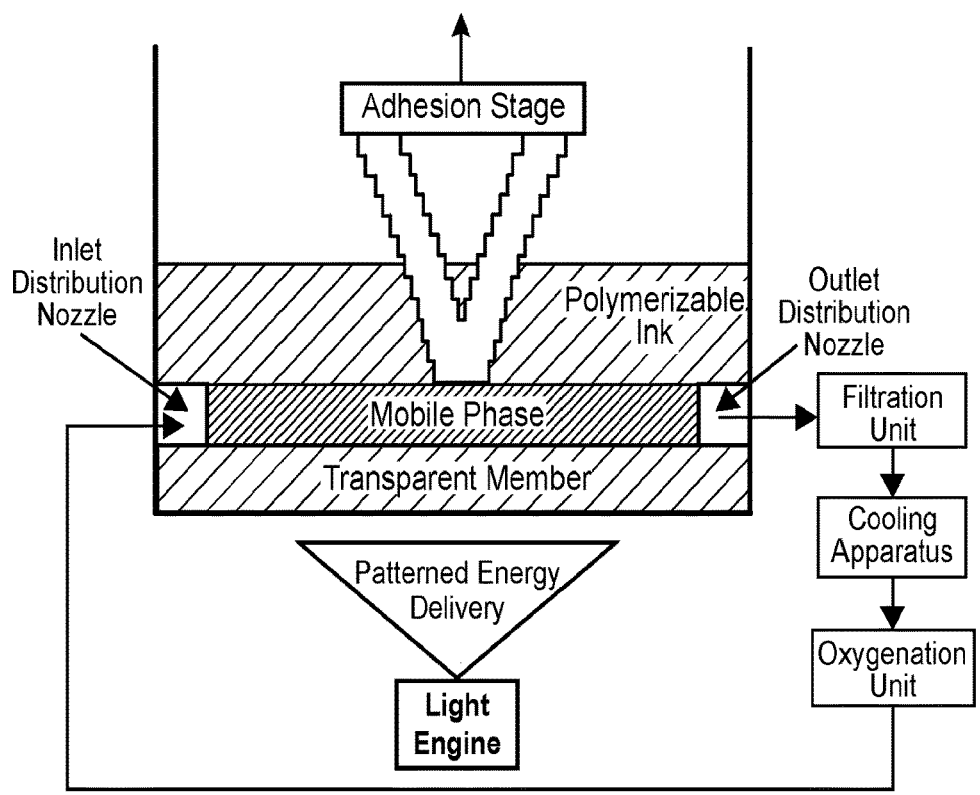
FIG. 11 is a side schematic view of one embodiment of an apparatus carrying out continuous polymerization having a flowing fluid mobile phase.
Figure 12:
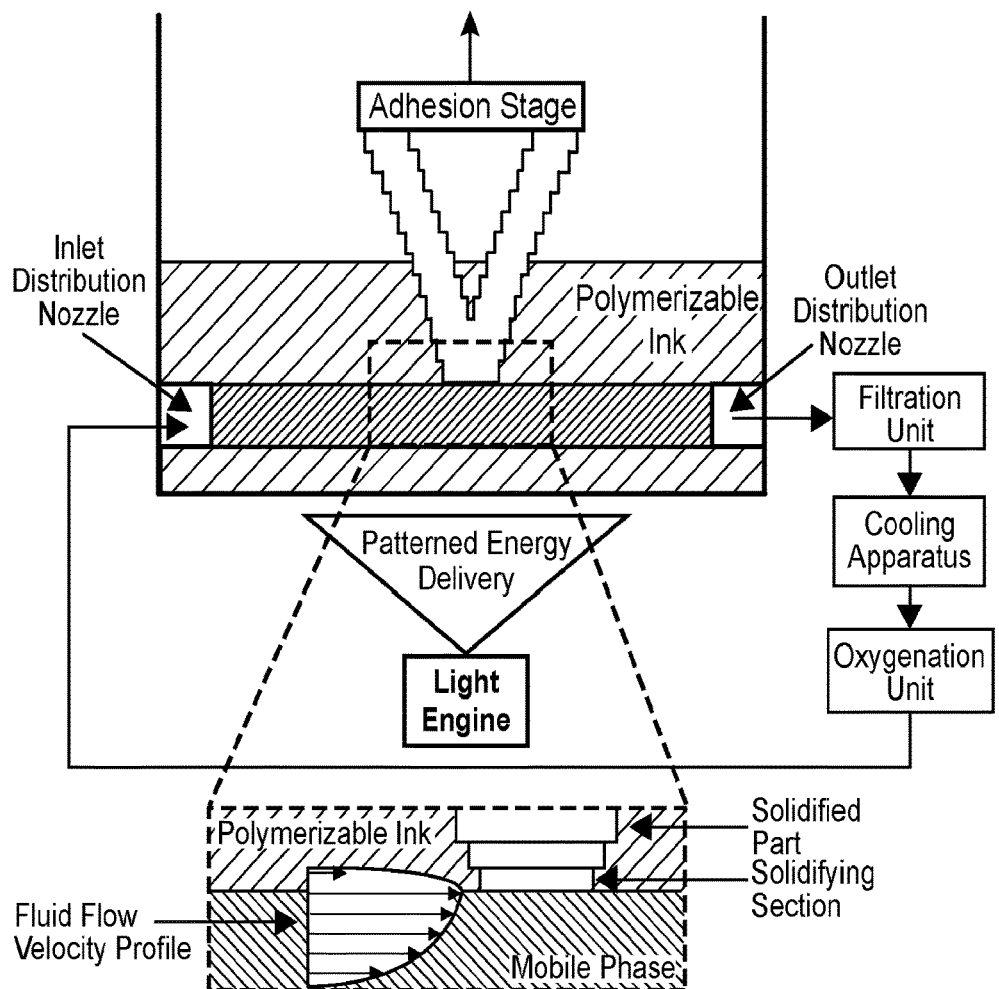
FIG. 12 is an expanded view of the fluid velocity profile at the build interface of the embodiment of the apparatus carrying out continuous polymerization as shown in FIG. 11.

In embodiments, once the polymerizable liquid and the dewetting phase are supplied together in a suitable apparatus, fabrication of the three dimensional object may commence, e.g., as shown in FIGS. 1-3. In embodiments, once the polymerizable liquid and mobile phase are supplied together in a suitable apparatus, fabrication of the three dimensional object may commence, e.g., as shown in FIGS. 9-11. Fabrication may be carried out layer-by-layer or continuously.

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In other embodiments of the invention, the advancing step is carried out continuously, at a uniform or variable rate. Note that fabrication of the product may be continuous (as opposed to layer-by-layer) even when the advancing step is carried out in increments.

In some embodiments, the rate of advance (whether carried out sequentially or continuously) is from about 0.1, 1, or 10 microns per second, up to about to 100, 1,000, or 10,000 microns per second, again depending again depending on factors such as temperature, pressure, structure of the article being produced, intensity of radiation, etc. In embodiments, the arm sustaining the adhesion stage and, thereby, the print, is retracted away from the build surface at a constant rate of about 10 microns, or about 30 microns per second up to about 200 microns, about 180 microns, about 160 microns, about 140 microns, or about 120 microns per second, thereby advancing the adhesion stage away from the build surface at a constant rate of about 10 microns per second to about 200 microns per second. In embodiments, the print is retracted away from the build surface at a rate in a range of about 100 microns per second to about 140 microns per second, for example, 120 microns per second.

Advancing the adhesion stage away from the build surface can comprise advancing the adhesion stage away from the build surface at a constant rate for a fixed distance and is then paused for a fixed amount of time, and optionally repeated. In some cases, advancing the adhesion stage away from the build surface can comprise advancing the adhesion stage away from the build surface at a variable rate for a fixed distance and is then paused for a fixed amount of time, and optionally repeated. The cycle of advancing the adhesion stage away from the build surface for a fixed distance followed by a pause for a fixed amount of time can provide an effective retraction rate (the total retraction displacement over the full time of the pull-pause cycle) of about 10 microns per second to about 200 microns per second, about 30 microns per second to about 120 microns per second, or about 100 microns per second to about 140 microns per second.

In some cases, advancing the adhesion stage away from the build surface comprises advancing the adhesion stage away from the build surface in an oscillating manner. For example, advancing the adhesion stage away from the build surface in an oscillating manner comprises a cycle comprising (i) advancing the adhesion stage away from the build surface and (ii) advancing the adhesion stage back toward the build surface. The advancing the adhesion stage away from the build surface in an oscillating manner can further comprising pausing the adhesion stage between advancing the adhesion stage away from the build surface and advancing the adhesion stage back toward the build surface. The advancing the adhesion stage away from the build surface in an oscillating manner can further including pausing the adhesion stage after advancing the adhesion stage back toward the build surface. The effective retraction rate (the total retraction displacement made over the full time of an oscillating cycle) can be in a range of about 10 microns per second to about 200 microns per second, about 15 microns per second to about 120 microns per second, about 30 microns per second to about 120 microns per second, or about 100 microns per second to about 140 microns per second.

A layering/ridging effect has been found to occur in known bottom-up printing system as a result of the dewetting phase moving up and pinching off as the printed part advances away. It is believed that the moving up and pinching off of the dewetting phase is caused by a combination of interfacial adhesive forces between the materials and the cavitation force formed when the printed part moves away from the interface of the dewetting phase and the polymerizable liquid. Without intending to be bound by theory, it is believed that the layering effect can be mitigated by advancing the adhesion stage away from the build surface in an oscillating manner. For example, advancing the adhesion stage away from the build surface by 500 microns, followed by 450 microns back toward the build surface (thus having a net displacement of 50 microns away from the build surface). It is believed that the large fast lift breaks the dewetting phase adhesion from the solidified object and thus reduces the surface ridging because the increased force results in a faster pinch of. In another example, advancing the adhesion stage away from the build surface by 500 microns rapidly, followed by 520 microns back towards the interface rapidly, followed by the retraction of the adhesion stage away from the building surface by 50 microns slowly, thereby resulting in a net motion of 30 microns per cycle and net speeds of 120 microns per second. By compressing the previous object layer against the newly polymerizing object layer at the interface (i.e. the forward step of 500 microns followed by a reverse step of 520 microns), continuous cross-linking between layers can be achieved. The energy source can be projected continuously to ensure a continuous print. Optionally, the energy source can be intermittent to halt polymerization while the object is not substantially adjacent to the interface.

Advancing the adhesion stage away from the build surface can in some cases include a mixture of a continuous pull and oscillating cycles. Without intending to be bound by theory, a continuous pull (having a constant or variable rate) can be used at the beginning of a print to reduce disruption of the print interface that may occur from an oscillating cycle while the adhesion stage is immersed in the polymerizable liquid. Thus, an oscillating cycle may be initiated after the adhesion stage has been advanced away from the build surface such that the adhesion stage is no longer immersed in the polymerizable liquid.

In some embodiments the providing a polymerizable liquid step is carried out by forcing the polymerizable liquid into the build region under pressure. In such a case, the advancing step or steps may be carried out at a rate or cumulative or average rate of at least 0.1, 1, 10, 50, 100, 500 or 1000 microns per second, or more. In general, the pressure may be whatever is sufficient to increase the rate of said advancing step(s) at least 2, 4, 6, 8 or 10 times as compared to the maximum rate of repetition of said advancing steps in the absence of said pressure. Where the pressure is provided by enclosing an apparatus such as described above in a pressure vessel and carrying the process out in a pressurized atmosphere (e.g., of air, air enriched with nitrogen, a blend of gases, etc.) a pressure of 10, 20, 30 or 40 pounds per square inch (PSI) up to, 200, 300, 400 or 500 PSI or more, may be used. For fabrication of large irregular objects higher pressures may be less preferred as compared to slower fabrication times due to the cost of a large high pressure vessel.

On the other hand, when smaller items are fabricated, or a rod or fiber is fabricated that can be removed or exited from the pressure vessel as it is produced through a port or orifice therein, then the size of the pressure vessel can be kept smaller relative to the size of the product being fabricated and higher pressures can (if desired) be more readily utilized.

In embodiments wherein the method includes a mobile phase, the mobile phase creates a shear force at the interface between the object being printed and the mobile phase, which helps pull polymerizable liquid into the build region, facilitating replenishment of depleted zones of polymerizable liquid generated as a solidified part is extracted, allowing for increased resolution of the emergent object.

The methods disclosed herein can further include cooling at least one of the member, dewetting phase, mobile phase, and the polymerizable liquid, or any combination thereof. The cooling of at least one of the member, dewetting phase, mobile phase, and polymerizable liquid can be achieved using a cooling apparatus, as described herein. In some embodiments, the cooling apparatus can be configured to maintain the dewetting phase in a non-liquid state. In some embodiments, the cooling apparatus is optically transparent.

The irradiating step is in some embodiments carried out with patterned irradiation. The patterned irradiation may be a fixed pattern or may be a variable pattern created by a pattern generator (e.g., a DLP, LCD, etc.) as discussed below, depending upon the particular item being fabricated.

When the patterned irradiation is a variable pattern rather than a pattern that is held constant over time, then each irradiating step may be any suitable time or duration depending on factors such as the intensity of the irradiation, the presence or absence of dyes in the polymerizable material, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds.

The exposing the build region to energy can include irradiating the build region with an energy source. Contemplated energy sources include electrical, chemical, magnetic, electromagnetic, photonic, acoustic, heating, and combinations thereof. Thus, one or more components of a suitable apparatus of the disclosure, including, but not limited to, the member, dewetting phase, mobile phase, and/or cooling apparatus can be optically transparent and/or can allow transduction or transmission of energy provided by an energy source (e.g., electrical, chemical, magnetic, electromagnetic, photonic, acoustic, heating, and combinations thereof).

In some embodiments, the member and the dewetting phase can be attached to a fiber optic projector, wherein the fiber optic projector delivers the energy for polymerization. In some embodiments, printing can occur omnidirectionally.

The methods disclosed herein can further include filtering, cleaning, and/or decontaminating the mobile phase. Generation of small light-scattering particles of polymerized ink can cause clouding of the mobile phase, which causes a loss in lateral resolution in a print and requires replacement of the interface after a certain number of prints. Filtering, cleaning, and/or decontaminating the mobile phase can remove the small scattering particles to reduce clouding and maintain suitable lateral resolution over a long print or multiple prints.

Clouding of the mobile phase can further be reduced by incorporating a cooling apparatus to minimize over-heating at the interface caused exothermic polymerization reactions. The cooling apparatus can cool the mobile phase, which can in turn cool the build region at the interface of the mobile phase and the polymerization liquid. In embodiments, cooling the mobile phase comprises passing the mobile phase through a cooling apparatus. In embodiments, cooling the mobile phase is via a heat exchanger that spans the build region.

The methods disclosed herein can further include oxygenating the mobile phase. Without intending to be bound by theory, it is believed that increasing the oxygen concentration in the mobile phase can further reduce interfacial surface adhesions. In contrast to known methods relying on diffusion of oxygen through a membrane, oxygenating the mobile phase advantageously actively transports inhibitors to a location in a controlled fashion, as opposed to relying upon passive diffusion.

Apparatus for Forming 3D Objects

Another aspect of the disclosure provides an apparatus for forming a three-dimensional object from a polymerizable liquid, the apparatus including a support, an adhesion stage operatively associated with the support on which adhesion stage the three-dimensional object is formed, a member having a dewetting phase thereon, the dewetting phase having a build surface, wherein the dewetting phase is not a liquid, with the build surface and adhesion stage defining a build region therebetween, a polymerizable liquid supply operatively associated with the build surface and configured to supply polymerizable liquid into the build region for solidification or polymerization, an energy source configured to deliver energy to the build region through the member to form a solid polymer from the polymerizable liquid, at least one controller operatively associated with the energy source for delivering energy to the build region, the at least one controller also operatively associated with the adhesion stage for advancing the adhesion stage away from the build surface at a rate that is dependent on energy intensity to form the three-dimensional object from the solid polymer.

In a related aspect, the disclosure provides an apparatus for forming a three-dimensional object from a polymerizable liquid, the apparatus including a support, an adhesion stage operatively associated with the support on which adhesion stage the three-dimensional object is formed, a member having a layer of dewetting phase thereon, the dewetting phase having a build surface, with the build surface and adhesion stage defining a build region therebetween, an optically transparent cooling apparatus, a polymerizable liquid supply operatively associated with the build surface and configured to supply polymerizable liquid into the build region for solidification or polymerization, an energy source configured to deliver energy to the build region through the member to form a solid polymer from the polymerizable liquid, and at least one controller operatively associated with the energy source for delivering energy to the build region, the at least one controller also operatively associated with the cooling apparatus for cooling the build region, the at least one controller also operatively associated with the adhesion stage for advancing the adhesion stage away from the build surface at a rate that is dependent on energy intensity to form the three-dimensional object from the solid polymer.

The methods of the present disclosure can be implemented with a variety of different apparatus. In the simplest embodiment, an apparatus as shown in FIG. 1 herein is employed. In brief overview, such an apparatus includes a vessel comprising an optically transparent member (window) for containing a dewetting phase, with a polymerizable liquid provided on top of the dewetting phase. The window is positioned at the bottom of the vessel, through which energy may be delivered to the build region to polymerize the polymerizable liquid. An adhesion stage is positioned over the vessel which gradually and progressively advances the growing three-dimensional object up and out of the polymerizable liquid. At least one controller (e.g., a computer with appropriate interface and program) may be provided (not shown), which operates the adhesion stage and, optionally, a cooling apparatus, e.g., responsive to data such as current temperature of the dewetting phase as determined by a temperature sensor. Additional and alternative features of the apparatus, and the operation thereof, are discussed further below.

Numerous variations on the apparatus described in FIG. 1 above can be employed. For example, energy may be supplied through a window positioned at the bottom of the dewetting phase as illustrated in FIG. 1, through the side of the dewetting phase (e.g., aided by a mirror or mirror assembly within the dewetting phase), may be achieved with an energy source positioned entirely within the polymerizable, may be achieved with a fiber optic or light pipe having a terminus within the polymerizable liquid. In embodiments, the optically transparent member and dewetting phase are attached to a fiber optic projector, and the fiber optic projector delivers the energy for polymerization.

The disclosure further provides an apparatus for forming a three-dimensional object from a polymerizable liquid, comprising a support, an adhesion stage operatively associated with the support on which adhesion stage the three-dimensional object is formed, a member having a layer of a mobile phase thereon, the mobile phase having a build surface, with the build surface and adhesion stage defining a build region therebetween, a polymerizable liquid supply operatively associated with the build surface and configured to supply polymerizable liquid into the build region for solidification or polymerization, an energy source configured to deliver energy to the build region through the member to form a solid polymer from the polymerizable liquid, and at least one controller operatively associated with the energy source for delivering energy to the build region, the at least one controller also operatively associated with the adhesion stage for advancing the adhesion stage away from the build surface at a rate that is dependent on energy intensity to form the three-dimensional object from the solid polymer.

The methods of the present disclosure can be implemented with a variety of different apparatus. In the simplest embodiment, an apparatus as shown in FIG. 9 herein is employed. In brief overview, such an apparatus includes a vessel comprising an optically transparent member (window) for containing a mobile phase, with a polymerizable liquid provided on top of the dewetting phase. The window is positioned at the bottom of the vessel, through which energy may be delivered to the build region to polymerize the polymerizable liquid. An adhesion stage is positioned over the vessel which gradually and progressively advances the growing three-dimensional object up and out of the polymerizable liquid. At least one controller (e.g., a computer with appropriate interface and program) may be provided (not shown), which operates the adhesion stage. Additional and alternative features of the apparatus, and the operation thereof, are discussed further below.

Figure 14:
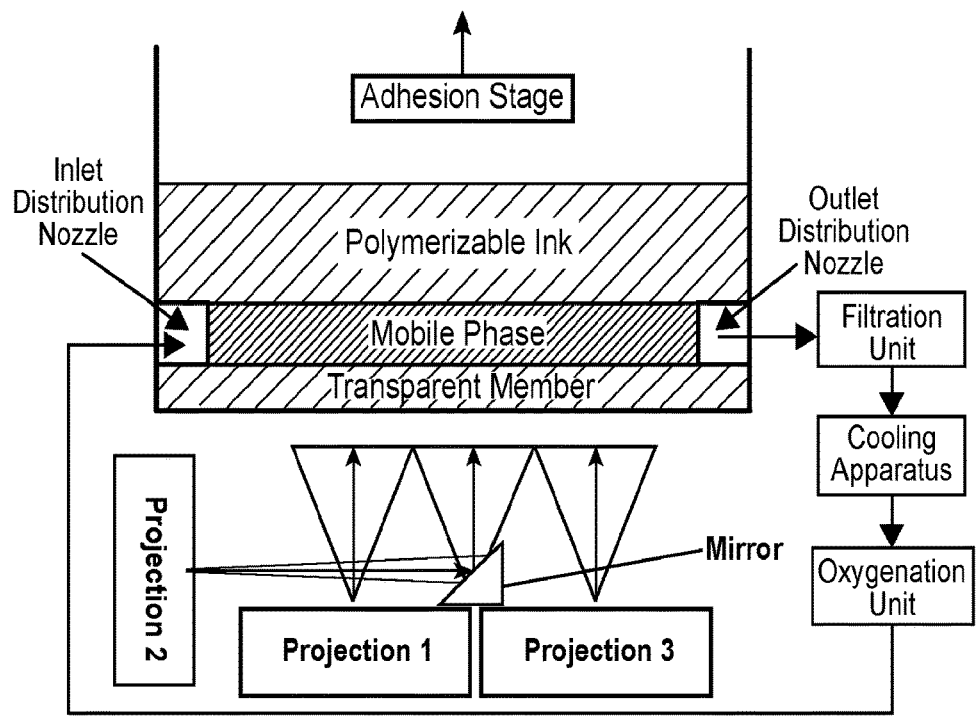
FIG. 14 is a side schematic view of one embodiment of an apparatus useful for carrying out a method as disclosed herein, in particular by using a multiple projection light engine.

Numerous variations on the apparatus described in FIG. 9 above can be employed. For example, energy may be supplied through a window positioned at the bottom of the mobile phase, through the side of the mobile phase (e.g., aided by a mirror or mirror assembly within the mobile phase as shown in FIG. 14).

In general, the member of the apparatus disclosed herein can be a support for the dewetting phase and/or mobile phase. Optionally, the member is optically transparent. Optionally, the member allows transduction or transmission of energy provided by an energy source selected from the groups consisting of electrical, chemical, magnetic, electromagnetic, photonic, acoustic, heating, and combinations thereof. Optionally, the member is not oxygen permeable. As used herein "not oxygen permeable" means that the member transmits less than 5% by volume, less than 3% by volume, or less than 1% by volume of the oxygen contained in the atmosphere to which the member is exposed. The member can be prepared from glass, low-iron and high-transparence glass variants (commercially referred to as sapphire glass), quartz, sapphire, soda lime (BK7) acrylic, fused silica, fused quartz, germanium, borosilicate, silicon nitride, or combinations thereof, as determined by the wavelength of the energy source emerging from the light engine.

As noted above, because the methods of the disclosure allow for polymerization to occur without strong adhesive forces between the solidified polymer and the underlying dewetting phase, the polymerizable liquid does not require a dead zone. Accordingly, in embodiments, the apparatus does not include a dead zone or inhibition region. In embodiments, the optically transparent member is not oxygen permeable. Further, because the methods of the disclosure can employ a dewetting phase and/or mobile phase that is not a liquid, the build surface can be advantageously be employed in an omni-directional manner and/or interfaces can be generated in curvilinear fashion such that they remain molecularly smooth, but not flat. Thus, in embodiments, the dewetting phase is curvilinear. In embodiments, the build surface is a horizontal surface. In embodiments, the build surface is a vertical surface.

In embodiments, the apparatus includes a cooling apparatus. Optionally, the cooling apparatus is optically transparent. In embodiments, the cooling apparatus is operatively associated with at least one of the member, dewetting phase, mobile phase, and/or polymerizable liquid. In embodiments, the cooling apparatus is a heat exchanger that spans the entire span of the build region. In embodiments, the at least one controller is operatively associated with the cooling apparatus and configured to maintain the dewetting phase in a non-liquid state. In embodiments, the cooling apparatus is operatively associated with at least one controller configured to control the temperature of at least one of the member, mobile phase, and/or polymerizable liquid.

The apparatus of the disclosure can further comprise an outlet in fluid communication with the mobile phase and an inlet in fluid communication with the mobile phase. In embodiments the inlet is further in fluid communication with a first, mobile phase supply reservoir and the outlet is further in fluid communication with a second, mobile phase capture reservoir, to allow a flow of mobile phase across the membrane. In alternative embodiments, the outlet is in fluid communication with the inlet to provide a recirculation loop and allow a flow of mobile phase across the membrane.

The apparatus of the disclosure can further include an outlet distribution nozzle in fluid communication with the mobile phase and comprising the outlet, and an inlet distribution nozzle in fluid communication with the mobile phase and comprising the inlet. The distribution nozzles advantageously facilitate formation of a relatively uniform flow of mobile phase across the build stage.

In embodiments wherein the outlet is in fluid communication with the inlet to provide a recirculation loop, the recirculation loop can further include a filtration unit provided along the recirculation loop between the outlet and the inlet, the filtration unit operatively associated with at least one controller configured to filter, clean, or decontaminate the mobile phase. The recirculation loop can further include a cooling apparatus along the recirculation loop between the outlet and the inlet, the cooling apparatus operatively associated with at least one controller configured to control the temperature of the mobile phase. The recirculation loop can further include an oxygenation unit along the recirculation loop between the outlet and the inlet, the oxygenation unit operatively associated with at least one controller configured to control the amount of oxygen provided to the mobile phase. In some embodiments, the recirculation loop include a filtration unit, a cooling apparatus, and an oxygenation unit. In some embodiments the recirculation loop includes a filtration unit and a cooling apparatus, a filtration unit and an oxygenation unit, or a cooling apparatus and an oxygenation unit. In some embodiments, the recirculation loop includes a filtration unit. In some embodiments the recirculation loop includes a cooling apparatus. In some embodiments, the recirculation loop includes an oxygenation unit. In any embodiment wherein the recirculation loop comprises two or more of a filtration unit, cooling apparatus, and oxygenation unit, the filtration unit, cooling apparatus, and oxygenation unit can be provided in any order along the circulation loop, for example, in the order filtration unit, cooling apparatus, oxygenation unit; filtration unit, oxygenation unit, cooling apparatus; cooling apparatus, filtration unit, oxygenation unit; cooling apparatus, oxygenation unit, filtration unit; oxygenation unit, filtration unit, cooling apparatus; or oxygenation unit, cooling apparatus, filtration unit. In embodiments, the recirculation loop is operatively associated with at least one controller configured to maintain a continuous flow of mobile phase. Optionally, the flow of mobile phase is maintained at a constant rate.

A polymerization liquid reservoir, tubing, pumps liquid level sensors and/or valves can be included to replenish the pool of polymerizable liquid (not shown), though in some embodiments a simple gravity feed may be employed. Drives/actuators for the adhesion stage, along with associated wiring, can be included in accordance with known techniques. The drives/actuators, energy source, and in some embodiments pumps and liquid level sensors can all be operatively associated with a suitable controller.

Any suitable energy source (or combination of sources) can be used in the apparatus, depending upon the particular polymerizable liquid employed, including electron beam and ionizing radiation sources. In embodiments, the energy source is configured to provide energy to the build region through the member to form a solid polymer from the polymerizable liquid. In embodiments, the energy source is a light engine. The light engine transmits energy so as to initiate a polymerization event in a patterned and/or controlled manner. Examples of light patterning tools include digital mirror devices or liquid crystal displays (LCD). In embodiments, the light engine has a light source selected from the group consisting of a mercury light source, light emitting diodes (LED) source, halogen light, and laser. In embodiments, the energy source is a thermal controller. In embodiments, the energy source is a micro-electrode array. In embodiments, the energy source is a photoconductive material. In embodiments, the energy source is a magnetic flux. In embodiments, the energy source is selected from the group consisting of electrochemical, electromagnetic, photoconductor, acoustic, heating, a circuit, a photodiode, a grid area, and combinations thereof. In embodiments, the energy source is selected from the group consisting of electrical, chemical, magnetic, electromagnetic, photonic, acoustic, heating, and combinations thereof.

In embodiments, the energy source is an actinic radiation source, such as one or more light sources, and in particular one or more ultraviolet light sources. Any suitable light source can be used, such as incandescent lights, fluorescent lights, phosphorescent or luminescent lights, a laser, light-emitting diode, etc., including arrays thereof. The light source preferably includes a pattern-forming element operatively associated with the controller. In embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526. Preferably the light source comprises a spatial light modulation array such as a liquid crystal light valve array or micromirror array or DMD (e.g., with an operatively associated digital light processor, typically in turn under the control of a suitable controller), configured to carry out exposure or irradiation of the polymerizable liquid without a mask, e.g., by maskless photolithography. See, e.g., U.S. Pat. Nos. 6,312,134; 6,248,509; 6,238,852; and 5,691,541.

While in some embodiments the support on which the adhesion stage is mounted can be an elevator to advance up and away from a stationary build surface, in other embodiments the converse arrangement may be used. That is, the adhesion stage may be on a fixed support and the build surface lowered to thereby advance the adhesion stage away therefrom. Numerous different mechanical configurations will be apparent to those skilled in the art to achieve the same result, in all of which the build surface is "stationary" in the sense that no lateral (X or Y) movement is required or no elastic build surface that must be stretched and then rebound (with associated over-advance, and back-up of, the adhesion stage) need be employed.

Depending on the choice of material from which the adhesion stage is fabricated, and the choice of polymer liquid from which the article is made, adhesion of the article to the adhesion stage may sometimes be insufficient to retain the article on the adhesion stage through to completion of the finished article or "build." For example, an aluminum adhesion stage may have lower adhesion than a poly(vinyl chloride) (or "PVC") adhesion stage. Hence one solution is to employ an adhesion stage comprising a PVC on the surface to which the article being fabricated is polymerized. If this promotes too great an adhesion to conveniently separate the finished part from the adhesion stage, then any of a variety of techniques can be used to further secure the article to a less adhesive adhesion stage, including but not limited to the application of adhesive tape such as "Greener Masking Tape for Basic Painting #2025 High adhesion" to further secure the article to the adhesion stage during fabrication. Additionally, polymeric or metallic mesh material can be secured to the stage such that supports formed early in the print process polymerize around the mesh, embedding parts of the adhesion stage within the object itself.

Soluble Sacrificial Layers.

In some embodiments, a soluble sacrificial layer or release layer may be established between the adhesion stage and the three-dimensional object, so that that sacrificial layer may be subsequently solubilized to conveniently release the three-dimensional object from the adhesion stage once fabrication is complete. Any suitable sacrificial layer, such as an adhesive, that may be coated or otherwise provided on the adhesion stage may be employed, and any suitable solvent (e.g., polar and non-polar organic solvents, aqueous solvents, etc. to solubilize the sacrificial release layer may be employed, though the sacrificial layer and its corresponding solvent should be chosen so that the particular material from which the three-dimensional object is formed is not itself unduly attacked or solubilized by that solvent. The sacrificial layer may be applied to the adhesion stage by any suitable technique, such as spraying, dip coating, painting, etc. Examples of suitable materials for the soluble sacrificial release layer (and non-limiting examples of corresponding solvents) include but are not limited to: cyanoacrylate adhesive (acetone solvent); poly(vinylpyrrolidone) (water and/or isopropyl alcohol solvent); lacquers (acetone solvent); polyvinyl alcohol, polyacrylic acid, poly(methacrylic acid), polyacrylamide, polyalkylene oxides such as poly(ethylene oxide), sugars and saccharides such as sucrose and dextran (all water or aqueous solvents); etc. Lower surface energy solvents are in some embodiments particularly preferred.

In some embodiments, the actuator/drive and/or associated controller are configured to only advance the adhesion stage away from the build region (e.g., is unidirectional). In some embodiments, the actuator/drive and/or associated controller are configured as a continuous drive (as opposed to a step-wise drive). The adhesion stage can be advanced away from the build stage at a constant rate or at a variable rate. In embodiments, the adhesion stage can be advanced away from the build stage in an oscillating manner.

A controller for use in carrying out the method of the disclosure may be implemented as hardware circuitry, software, or a combination thereof. In one embodiment, the controller is a general purpose computer that runs software, operatively associated with monitors, drives, pumps, and other components through suitable interface hardware and/or software. Suitable software for the control of a three-dimensional printing or fabrication method and apparatus as described herein includes, but is not limited to, the ReplicatorG open source 3d printing program, 3DPrint™ controller software from 3D systems, Slic3r, Skeinforge, KISSlicer, Repetier-Host, PrintRun, Cura, etc., including combinations thereof.

Process parameters to directly or indirectly monitor, continuously or intermittently, during the process (e.g., during one, some or all of said filling, irradiating and advancing steps) include, but are not limited to, energy intensity, temperature of adhesion stage, polymerizable liquid in the build zone, temperature of growing product, temperature of dewetting phase, pressure, speed of advance, pressure, strain (e.g., exerted on the adhesion stage by the growing product being fabricated), thickness of release layer, etc.

Known parameters that may be used in feedback and/or feed-forward control systems include, but are not limited to, expected consumption of polymerizable liquid (e.g., from the known geometry or volume of the article being fabricated), degradation temperature of the polymer being formed from the polymerizable liquid, etc.

Process conditions to directly or indirectly control, continuously or step-wise, in response to a monitored parameter, and/or known parameters (e.g., during any or all of the process steps noted above), include, but are not limited to, rate of supply of polymerizable liquid, temperature, pressure, rate or speed of advance of adhesion stage, intensity of energy provided, duration of energy provided (e.g. for each "slice"), etc.

For example, the temperature of the polymerizable liquid in the build zone, or the temperature of the dewetting phase, can be monitored, directly or indirectly with an appropriate thermocouple, non-contact temperature sensor (e.g., an infrared temperature sensor), or other suitable temperature sensor, to determine whether the temperature exceeds the degradation temperature of the polymerized product. If so, a process parameter may be adjusted through a controller to reduce the temperature in the build zone and/or of the dewetting phase. Suitable process parameters for such adjustment may include: decreasing temperature with a cooling apparatus, decreasing the rate of advance of the adhesion stage, decreasing intensity of the energy provided, decreasing duration of energy provided, etc.

In addition, the intensity of the energy source (e.g., an ultraviolet light source such as a mercury lamp) may be monitored with a photodetector to detect a decrease of intensity from the irradiation source (e.g., through routine degradation thereof during use). If detected, a process parameter may be adjusted through a controller to accommodate the loss of intensity. Suitable process parameters for such adjustment may include: increasing temperature with a heater, decreasing the rate of advance of the adhesion stage, increasing power to the light source, etc.

As another example, control of temperature and/or pressure to enhance fabrication time may be achieved with heaters and coolers (individually, or in combination with one another and separately responsive to a controller), and/or with a pressure supply (e.g., pump, pressure vessel, valves and combinations thereof) and/or a pressure release mechanism such as a controllable valve (individually, or in combination with one another and separately responsive to a controller).

In embodiments wherein the energy source is a light, the speed of fabrication can increase with increased light intensity. In some embodiments, the light is concentrated or "focused" at the build region to increase the speed of fabrication. This may be accomplished using an optical device such as an objective lens. The speed of fabrication may be generally proportional to the light intensity. For example, the build speed in millimeters per hour may be calculated by multiplying the light intensity in milliWatts per square centimeter and a multiplier. The multiplier may depend on a variety of factors, including those discussed below. A range of multipliers, from low to high, may be employed. On the low end of the range, the multiplier may be about 10, 15, 20 or 30. On the high end of the multiplier range, the multiplier may be about 150, 300, 400 or more.

Certain optical characteristics of the light may be selected to facilitate increased speed of fabrication. By way of example, a band pass filter may be used with a mercury bulb light source to provide 365±10 nm light measured at Full Width Half Maximum (FWHM). By way of further example, a band pass filter may be used with an LED light source to provide 375±15 nm light measured at FWHM.

As noted above, polymerizable liquids used in such processes can be free radical polymerizable liquids, or acid-catalyzed or cationically polymerizable liquids. Some specific polymerizable liquids will of course cure more rapidly or efficiently than others and hence be more amenable to higher speeds, though this may be offset at least in part by further increasing light intensity.

In general, lower viscosity polymerizable liquids are more amenable to higher speeds, particularly for fabrication of articles with a large and/or dense cross section (although this can be offset at least in part by increasing light intensity). Polymerizable liquids with viscosities in the range of 50 or 100 centipoise, up to 600, 800 or 1000 centipoise or more (as measured at room temperature and atmospheric pressure with a suitable device such as a HYDRAMOTION REACTAVISC™ Viscometer (available from Hydramotion Ltd, 1 York 25 Road Business Park, Malton, York Y017 6YA England). In some embodiments, where necessary, the viscosity of the polymerizable liquid can advantageously be reduced by heating the polymerizable liquid.

Fabrication Products

Three-dimensional products produced by the methods and apparatus of the present disclosure may be final, finished or substantially finished products, or may be intermediate products subject to further manufacturing steps such as surface treatment, laser cutting, electric discharge machining, etc., is intended.

Numerous different products can be made by the methods and apparatus of the present disclosure, including both large-scale models or prototypes, small custom products, miniature or microminiature products or devices, etc. Examples include, but are not limited to, medical devices and implantable medical devices such as stents, drug delivery depots, functional structures, microneedle arrays, fibers and rods such as waveguides, micromechanical devices, microfluidic devices, etc.

The processes described herein can produce products with a variety of different properties. Hence in some embodiments the products are rigid; in other embodiments the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single polymerizable liquid); in some embodiments, the products are composites (that is, formed of two or more different polymerizable liquids). Particular properties will be determined by factors such as the choice of polymerizable liquid(s) employed.

The methods and apparatus in accordance with the disclosure can be better understood in light of the following examples, which are merely intended to illustrate the constructs and are not meant to limit the scope thereof in any way.

EXAMPLES

Example 1: Organic Phase Polymerizable Liquids: Monomers/Crosslinkers with Photo-Initiators 1,6-hexanediol diacrylate (HDDA) was used as the basis of the organic phase polymerizable liquid. HDDA was procured from either Sigma-Aldrich or TCI America with inhibitors present (100 ppm monomethyl ether hydroquinone). These inhibitors were removed prior to use by base extraction. Briefly, to 15 mL of HDDA monomer solution, 30 mL of 50 mM NaOH solution was added and shaken. The inhibitors were deprotonated and extracted into the aqueous phase and removed by separatory funnel. Following shaking, densification of the aqueous layer with NaCl (ranging from 1-2M final concentration) was used to facilitate the separation. Three subsequent extractions were performed—two against 50 mM NaOH 1M NaCl solutions and the final against 1M NaCl solution. The monomer layer was recovered and dried over magnesium sulfate and then isolated by vacuum filtration.

A similar work-up was applied to pentaerythritol triacrylate and trimethylolpropane triacrylate (TMPTA) to remove hydroquinone based inhibitors.

The polymerizable liquid further included a photo-initiator. 0.1 wt. % to 0.5 wt. % of each of 4,4'-Bis(diethylamino) benzophenone (with a primary absorbance centered around 370 nm), Phenylbis(2,4,6-trimethylbenzoyl)phosphine oxide (with a primary absorbance centered around 300 nm and a secondary absorbance at 370 nm), diphenyl(2,4,6-trimethylbenzoyl)phosphine oxide (with a primary absorbance centered around 380 nm with secondary absorbances at 370 nm and 390 nm) were independently added to HDDA samples and the HDDA samples were irradiated with a high energy UV source (i.e., a high pressure mercury lamp with emissions in the region from 200 nm to 400 nm). All of the initiators polymerized HDDA.

Thus, Example 1 shows that organic polymerizable liquids according to the disclosure can be polymerized in the presence of an initiator by an energy source according to the disclosure.

Example 2: 2D Image Generation

Printing experiments were performed on dense water (i.e., deuterium dioxide, saturated NaCl solutions, and solutions saturated with CsCl) and fluorinated solvents (perfluoro-n-hexane, perfluoro-n-octane) as the dewetting phase. Experiments were performed in fluorescence quartz cuvettes in which 1-2 ml of the denser, de-wetting liquid was added to the bottom of the cuvette and the lighter monomer/initiator mix from Example 1 was added on top (e.g, HDDA with 5% Irgacure 819). A mask/pinhole was used to pattern light from a collimated optical fiber connected to a high pressure mercury lamp. Exposures ranged from 1 second to 30 seconds and resulted in polymeric drops forming at the interface.

Example 3: Printing of 3D Cylindrical Pillars

Fluorescence quartz cuvettes containing dewetting phases and polymerizable liquids were prepared as in Example 2, however light quenching dyes were added to the polymerizable liquid layer (i.e. HDDA solution with 5% Irgacure 819 saturated with either naphthalene or anthracene) to limit the light penetration into the polymerizable layer. Upon this addition, thin polymeric disks of ~200 um thick were formed at the de-wetting interface. These thin polymer disks were cross-linked onto the end of a capillary tube and, upon the slow retraction from the interface, formed solidified-layered structures. The light source can be further modified by passing it through a 200 um pin-hole and then through a 15× UV transparent microscope objective with a 3 cm working distance. Upon 30 seconds of irradiation, an ~200 um wide polymeric dot was observed floating at the interface. By focusing the lens onto the end of a glass capillary tube, and slowly retracting the capillary away from the interface (~100 um/30 sec), a cylindrical pillar can be formed with a diameter of ~200 um a lengths of several millimeters.

Example 4: Perfluorinated Dewetting Phases

Fluorescence quartz cuvettes containing dewetting phases and polymerizable liquids were prepared as in Example 2, however perfluorinated oils were utilized as the dewetting phases. The perfluorinated oils included Krytox GPL-100 and Krytox XHT-1000. Both were able to be layered over quartz windows in home-built fluid cells. On top of these fluorinated layers, a polymerizable fluid (HDDA, 5% wt Irgacure 819) was floated on top. The polymerizable liquid layer was irradiated using one of multiple light sources (mercury lamp, UV-blue LED, halogen lamp) through the quartz window which supports the liquid layers. Polymeric patterns were observed to form at the fluoro-organic interface. These patterns can be controlled through a masking layer, a pin-hole, or through the utilization of a digital micromirror device (DMD). Once again, after observation of 2D structures, these structures were formed polymerized on the ends of capillary tubes or metal AFM chucks and then retracted slowly away from the interface using a micropositioner. Using a series of masks (or the DMD device) different patterns could be projected onto the interface to generate non-prismatic 3D structures.

Example 5: Gel Based Dewetting Phase

A hydrogel comprising 2.5 wt % agar or agarose was formed by dissolving/mixing agar or agarose solid into DI water and allowing the material to swell for 30 minutes. After this time, the mixture was heated in a microwave to its boiling point (a plastic cover is loosely applied to prevent the evaporation of water from the mixture). This molten mixture was then poured into petri-dishes or patterns (glass windows with ~1 mm silicone spacers on the edges) to form thin agarose hydrogel windows. These windows were allowed to cool, set into a semi-solid and rinsed/stored in DI water.

A quartz window with a 1 mm agarose hydrogel on top of it was clamped into a home-built fluid cell. A polymerizable liquid layer (95% wt. HDDA, 5% wt. Irgacure 819) was added to form a pool ~1 cm deep. As in Example 2, patterned irradiation was used to generate 2D images at first. This was then followed by attaching a 2D 'base' onto a stage (capillary tubes, metal plate, etc.) and then retracting the stages away from the interface at speeds ranging from 1 um/sec to 50 um/sec. Upon higher retraction rates (and thus, increased polymerization rates), excess heat that was generated from the polymerization reaction caused permanent damage to the hydrogel surface (i.e., the water began to boil and the hydrogel surface deformed). While these deformations did not limit the de-wetting nature of the surface (it created curved surfaces on the resultant objects), once the hydrogel had been penetrated and the hydrogel had been boiled away, it allowed contact between the quartz window and the polymerizable fluid and was considered compromised.

Similar results were observed for fluorogels that were preliminarily generated by the cross-linking of 2-(perfluorohexyl)ethyl acrylate) monomer with 1-5% wt 2-hydroxy-2-methylpropiophenone photo-radical initiator and then swelled with the perfluoro-polymer Fluoriner FC-70.

Thus, Example 5 demonstrates a method of forming a three-dimensional object according to the disclosure using a dewetting phase according to the disclosure that is not a liquid.

Example 6: Employment of Cooling Stage

The fluoro-oil/polymer-liquid and gel/polymer-liquid systems of Example 4 and Example 5 were used with a cooling device. The transparent cooling apparatus was filled with acetone chilled by dry-ice. The chilled acetone was allowed to pass between two optically transparent windows and continuously chilled the de-wetting phase. In the case of the Krytox XHT-100, the coolant caused the oil to solidify as the temperature dropped below the flow-point of the oil (i.e. −5° C.). It was found to be important that the path between the patterned light source and the bottom of the chiller window be kept dry (i.e. an enclosed plastic chamber with desiccant) to minimize ice formation and condensation upon the windows. Importantly, in all cases (gels and solidified oils), the cooling window allowed for rapid and uniform heat dissipation during the polymerization process. Without such a cooling, damage (as described in Example 4) occurred to the smooth interface due to the exothermic polymerization reaction at faster build rates (i.e. rates exceeding 50 μm/sec). Multiple builds have been generated at rates ranging from 150 μm/sec to 300 μm/sec repeatedly and reliably when a cooling stage was employed. Builds on the order of ~100 $cm^2$ in cross-sectional area and over 15 cm in height have been achieved.

Thus, Example 6 demonstrates a method of forming a three-dimensional object according to the disclosure using dewetting phases according to the disclosure that are not liquids and in conjunction with an optically transparent cooling apparatus which spanned the build domain.

Example 7: Employment of Cooling Stage with Multi-Projector Systems

A low-iron glass bottom custom aquarium, of dimensions 14"×17"×6" (W×L×H), was equipped with four 1 cm stand-offs such that the bottom of the aquarium was raised off of any surface on which it rested. This aquarium will thus be referred to as the 'print bed' where its bottom constitutes a 'member'.

A second low-iron glass bottom aquarium, of larger dimensions, was equipped with a distribution nozzle on one side and an over-flow outlet on the other to create a uniform and unidirectional flow pattern between the inlet and outlet. The inlet and outlet of this aquarium were connected to a recirculating chiller and filtration system, which recirculated an aqueous glycol solution and held the bath at a constant temperature ranging from −10° C. to 25° C. This system (aquarium, nozzles, and recirculating chiller) will thus be referred to as the 'cooling stage'.

Two consumer grade DLP projectors were modified to emit the maximum amount of UV light possible from their mercury lamps. This was achieved by removal of UV-filters within the projector housing, removal of the 'color wheel' responsible for generating red, green, and blue lights, and modification of the projection lens. Two of these projectors were mounted on an optical track system to allow for their alignment and tiling to generate a projected image over an area of 12"×15" at a throw distance of about 12". Individually, each projector generated a 12"×7.5" area. These projectors were connected to a custom computer system having a software capable of projecting a unified image across the two tiled projectors, along with mirroring the projected UV-light image to standard computer monitors. This system (aligned, UV-maximization modified projectors, and computer system) was the 'light-engine', 'optical-engine', or 'optics engine'. When not in use, the projected light from the light-engine was eliminated by a shutter mechanism.

The light-engine, cooling stage, and print-bed were stacked vertically within a support framework so as to generate a configuration as that depicted in FIG. 4—in which patterned UV-light was projected upward, from the light engine, through the UV-transparent cooling stage, and into which sat the UV-transparent print-bed (the low-iron glass constituting the 'member'). Due to the 1 cm spacers supporting the member, glycol coolant was able to flow under the print stage—acting to actively cool the de-wetting phase and dissipate heat generated in the soon to be created build region on top of the member.

Figure 15:
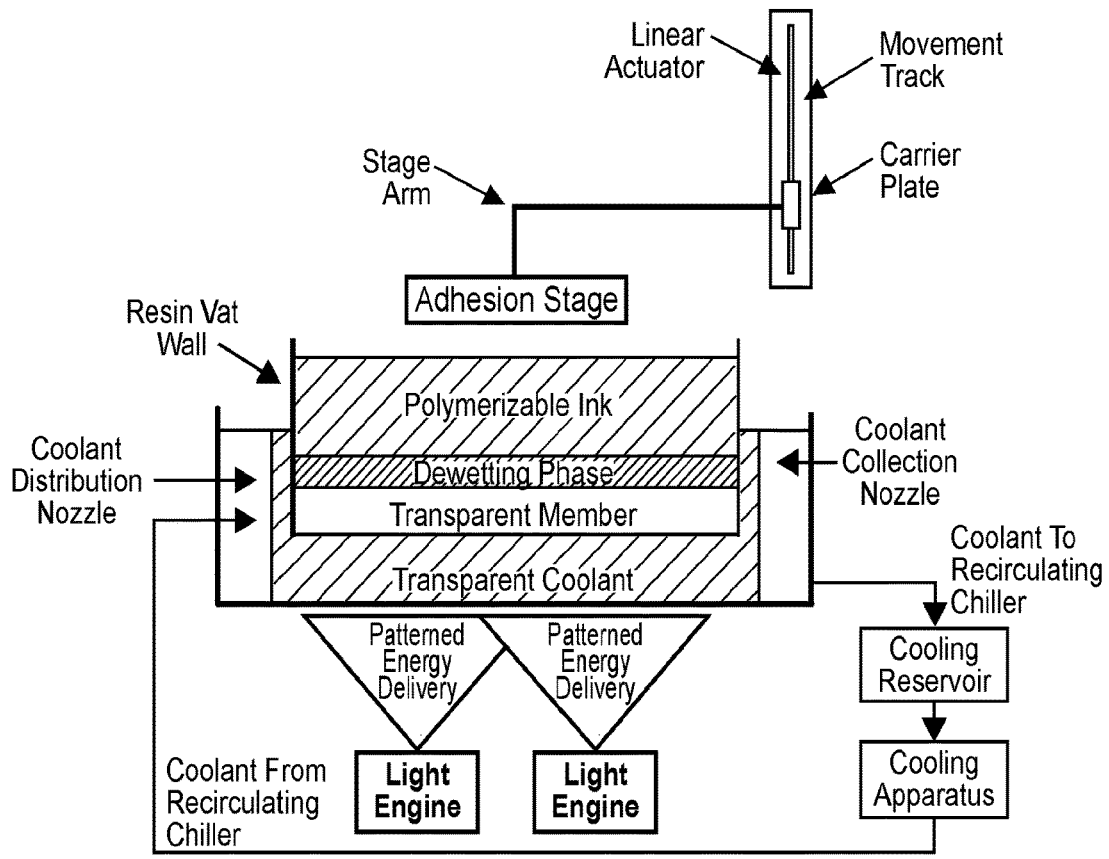
FIG. 15 is a side schematic view of one embodiment of an apparatus useful for carrying out a method as disclosed herein, particularly through the combination of multiple light engines, a transparent cooling apparatus, a transparent member with a dewetting phase thereon, polymerizable liquid, and an adhesion stage, wherein the motion of the adhesion stage is dictated by a computer controlled linear actuator.

Above the print bed, attached to the support framework, a 4' linear actuator was mounted. The actuator was mounted in a configuration effectively normal to the plane generated by the member (glass bottom of print bed). The actuator's carriage was fitted with a support which held an 'adhesion stage' (12"×12" porous plate) whose plane was effectively parallel to the plane generated by the member. The linear actuator was connected to the computer system driving the light-engine, and was programmed to bring the adhesion stage 1 cm above the bottom of the print bed (the member) and to then retract the adhesion stage in a systematic manner. The net retraction rate of said adhesion stage ranged from 10 micrometers per second to rates in excess of 180 micrometers per second. This system was the 'actuator' and 'adhesion stage'. A side schematic view of the apparatus is shown in FIG. 15.

With the adhesion stage retracted away from the printbed, a volume of fluoro-oil (either Krytox™ oil from the Chemours Company (Wilmington, Del.) or Fomblin® oil from Solvay (Alpharetta, Ga.)) was poured into the print bed to generate a de-wetting phase of ~1 cm thickness across the low-iron glass member. After this, the light-engine was un-shuttered, so as to produce a projected test image at the air/fluoro-oil interface. This projected image was focused, and fine alignment of the tiled projectors was performed to ensure the projected image at the interface was crisp and continuous. Once complete, the light-engine was shuttered, and image sequences loaded for a subsequent print. Upon de-shuttering, the image sequences would be projected.

After fine alignment and shuttering of the light engine, the adhesion stage was brought back to the fluoro-oil de-wetting phase (bottom of the actuator's vertical range) and the vertical position of the stage was finely adjusted so as to just come into contact with the liquid surface. Once in place, a polymerizable liquid was added to the print bed, forming a pool which floated upon the underlying fluoro-oil de-wetting phase. After a sufficient supply of resin was added, the chiller stage was activated so as to bring the member and de-wetting phase to an appropriate temperature (0° C. to 10° C.) and hold said temperature.

The aforementioned polymerizable liquid and/or resin included hexanediol diacrylate (HDDA) reactive monomers, acrylate functionalized block-co-polymers, and 2% Irgacure 819 photo-initiator (Phenylbis(2,4,6-trimethylbenzoyl) phosphine oxide). The mixture of co-polymer resins, reactive-diluent monomers, and photo-imitators was referred to as either the 'polymerizable liquid' or simply as 'resin'.

After addition of the polymerizable resin to the print bed and temperature stabilization of the de-wetting phase, the shutter on the light-engine was disengaged, allowing for pattern UV-Light to enter the print bed. The actuator (and thus the adhesion stage) was then retracted away from the de-wetting phase at a pre-determined net rate. In the initial stages of polymerization, this rate was slow to allow for stronger adhesion between the emerging print object with the adhesion stage itself. For example, when the object was retracted away in an oscillating motion, the rate of retraction was no greater than about 60 micrometers per second. When the object was retracted away using a continuous motion, the rate of retraction was up to about 120 micrometers per second. Once the print stage had fully emerged from the resin pool, the actuator retraction speed, and correspondingly the images being projected by light engines, were increased to rates in excess of 180 micrometers per second.

Once the predetermined image sequence had concluded, and thus the printed object complete, the light-engine was shuttered. The actuator was commanded to raise the final object out of the print bed, and residual resin was allowed to drip back into the print bed. The printed objects, still adhered to the adhesion stage, were removed from the supporting actuator arm, and washed in an organic solvent chemical bath to remove un-polymerized liquid resin from the surface of the printed object. Once sufficiently washed, the 'green' object (i.e. not fully cured/set) was allowed to dry, carefully removed from the print stage, and then placed within a UV-light oven to fully set its shape and adopt the intended material properties. After curing in the light oven, the final solidified object was subjected to use and further testing.

Thus, Example 7 demonstrates a method of forming a three-dimensional object according to the disclosure using dewetting liquids according to the disclosure in combination with a transparent cooling apparatus which spans the build domain. Additionally, Example 7 demonstrates faster print rates (at least about 120 micrometers per second) over large areas (12"×15") which were not possible in previous examples without the optically transparent cooling apparatus. Additionally, Example 7 demonstrates the ability to tile light engines into arrays, alignment of said light engines, and the ability to print a single continuous object which spans multiple light engines.

Example 8: Employment of Mobile Phase with Cooling

This system utilizes the same light-engine, adhesion stage/actuator, and resins described within Example 7. The two transparent beds constituting the cooling stage and print bed are replaced by a single transparent bed fitted with distribution nozzles on either side of the bed as shown in FIG. 13. This singular transparent bed was the 'print-bed', its low-iron glass bottom constituting a member upon which a de-wetting mobile phase may be placed.

As in Example 7, a support-frame was used to vertically stack the light-engine, the print bed, and the actuator arm which moves the adhesion stage. As before, the light-engine projected patterned light upwards, through the transparent bottom of the print bed (the member) and through a fluorinated oil (the dewetting phase) to initiate the solidification of resin (the polymerizable fluid). There is no secondary transparent bed constituting an optically transparent cooler used in this example—although this is optionally possible.

The two distribution nozzles at either side of the print bed were used as an inlet and outlet, and the fluoro-oil as acted as a mobile phase which was recirculated through the bed with a relatively uniform flow field across the build region. The projection area of 12"×15", generated by the light engine, rested between the two distribution nozzles. The fluorinated oil, once pumped out of the print-bed, is optionally filtered, chilled, and oxygenated. In this example the oil is passed through a filtration system, to remove any microparticles which could cause undesirable light-scattering, and a chiller, too cool the oil directly, only. Oxygenation of the de-wetting phase was not necessary, but is optional and may enhance the final print speeds possible.

Once the fluoro-oil was placed within the print bed so as to completely submerge the nozzle inlet and outlet, it was recirculated and the adhesion stage retracted away from the air-oil interface. At this point, the light-engine was unshuttered, so as to produce a projected test image at the air/fluoro-oil interface. This projected image was focused, and fine alignment of the tiled projectors was performed to ensure the projected image at the interface was crisp and continuous. Once complete, the light-engine was shuttered, and image sequences loaded for a subsequent print. Upon de-shuttering, the image sequences would be projected.

After fine alignment and shuttering of the light engine, the adhesion stage was brought back to the fluoro-oil de-wetting phase (bottom of the actuator's vertical range) and the vertical position of the stage was finely adjusted so as to just come into contact with the liquid surface. With the adhesion stage in place, the recirculation of the mobile phase was temporarily halted during the addition of resin to the print bed, forming a resin pool which floated upon the underlying fluoro-oil de-wetting phase. After a sufficient supply of resin was added, the recirculation of the mobile phase was re-started. Owing to the distribution nozzles location below the Moro-oil/resin interface, only the oil was drawn through the recirculation loop. Once the recirculation of the oil was continued, the chilling apparatus plumbed within the recirculation loop is activated until the mobile phase is brought to an appropriate temperature of about 0° C. to 10° C.

After addition of the polymerizable resin to the print bed and temperature stabilization of the mobile phase, the shutter on the light-engine was disengaged, allowing for pattern UV-Light to enter the print bed. The actuator (and thus the adhesion stage) was then retracted away from the de-wetting phase at a pre-determined net rate. In the initial stages of polymerization, this rate was slow to allow for stronger adhesion between the emerging print object with the adhesion stage itself. Once the print stage had fully emerged from the resin pool, the actuator retraction speed, and correspondingly the images being projected by light engines, were increased to rates in excess of 180 micrometers per second.

The movement of the dewetting phase relative to the emerging print resulted in a shear-force which lowered the adhesive interactions between these emerging print and the dewetting phase. Resultantly, the emerging print was found to have superior lateral (X-Y) resolution and surface finish, relative to printing from the same phase when held stationary and cooled as disclosed in Example 7.

Once the predetermined image sequence had concluded, and thus the printed object complete, the light-engine was shuttered. The actuator was commanded to raise the final object out of the print bed, and residual resin was allowed to drip back into the print bed. The cooling and recirculation of the mobile phase was discontinued. The printed objects, still adhered to the print stage, were removed from the supporting actuator arm, and washed in an organic solvent chemical bath to remove un-polymerized liquid resin from the surface of the printed object. Once sufficiently washed, the 'green' object (i.e. not fully cured/set) was allowed to dry, carefully removed from the print stage, and then placed within a UV-light oven to fully set its shape and fully react so as to adopt the intended material properties. After curing in the light oven, the final solidified object was be subjected to use and further testing.

By actively cooling the de-wetting phase directly—as opposed to Example 7 in which a glycol solution was used in a transparent heat-exchanger as an intermediary—rates of heat removal during printing are enhanced, providing good thermal stability. Additionally, as described above, for known systems, for longer prints there is typically the accumulation of small micro-particulate polymer which induces undesirable light scattering in the build-region, and thus causes a loss in lateral resolution. This phenomena in the SLA 3D printing field is often called 'clouding', and the only solution is the replacement of the dewetting phase. In that scenario, following the completion of the print the de-wetting phase must be removed and vacuum filtered to remove such particles. Thus, there is a great advantage, over other technologies, to be able to recycle the de-wetting interface due to continuous filtering and regeneration throughout the print. This is advantageous as it allows for the printer to continue printing for longer periods of time and to produce larger volumes before maintenance is required.

Thus, Example 8 demonstrates a method of forming a three-dimensional object according to the disclosure using a mobile phase which is cooled. Additionally, Example 8 demonstrates a method for continuously regenerating the build interface by the removal of micro-particle contaminants formed during the print process from the dewetting, mobile phase, and increased print resolution resulting from the lower adhesive forces between the mobile phase and the emerging object.

What is claimed:

1. An apparatus for forming a three-dimensional object from a polymerizable liquid, comprising:
   a support;
   an adhesion stage operatively associated with the support on which adhesion stage the three-dimensional object is formed;
   a member having a layer of a dewetting phase thereon, the dewetting phase having a build surface, with the build surface and adhesion stage defining a build region therebetween;
   an optically transparent cooling apparatus that spans the entire span of the build region, the optically transparent cooling apparatus in contact with the member and the member provided between the optically transparent cooling apparatus and the dewetting phase;
   a polymerizable liquid supply operatively associated with the build surface and configured to supply polymerizable liquid into the build region for solidification or polymerization;
   an energy source configured to deliver energy to the build region through the member to form a solid polymer from the polymerizable liquid; and
   at least one controller operatively associated with the energy source for delivering energy to the build region, the at least one controller also operatively associated with the cooling apparatus for cooling the build region, the at least one controller also operatively associated with the adhesion stage for advancing the adhesion stage away from the build surface at a rate that is dependent on energy intensity to form the three-dimensional object from the solid polymer.

2. The apparatus of claim 1, wherein the member, dewetting phase, cooling apparatus, or a combination thereof is optically transparent or allows transduction or transmission of energy provided by an energy source selected from the group consisting of electrical, chemical, magnetic, electromagnetic, photonic, acoustic, heating, and combinations thereof.

3. The apparatus of claim 1, wherein the optically transparent cooling apparatus is operatively associated with at least one of the member, dewetting phase, and polymerizable liquid.

4. The apparatus of claim 1, wherein the at least one controller is operatively associated with the optically transparent cooling apparatus and configured to control the temperature of at least one of the member, mobile phase, or polymerizable liquid.

5. The apparatus of claim 1, wherein the energy source is configured to provide energy to the build region through the member to form a solid polymer from the polymerizable liquid, and the energy source is selected from the group consisting of electrical, chemical, magnetic, electromagnetic, photonic, acoustic, heating and combinations thereof.

6. The apparatus of claim 1, wherein the adhesion stage is operatively associated with an actuation arm configured to advance the adhesion stage away from the build stage.

7. The apparatus of claim 1, further comprising
a vessel comprising the member,
wherein the vessel comprises an inlet and an outlet in fluid communication with the dewetting phase, the outlet in fluid communication with the inlet to form a loop to recirculate at least a portion of the dewetting phase.

8. The apparatus of claim 7, further comprising a filtration unit, a cooling apparatus, or an oxygenation unit provided along the recirculation loop between the outlet and the inlet, the filtration unit, cooling apparatus, or oxygenation unit operatively associated with at least one controller configured to filter, clean, or decontaminate the dewetting phase, control the temperature of the dewetting phase, or control the amount of oxygen provided to the dewetting phase.

9. The apparatus of claim 1, wherein the cooling apparatus is operatively associated with at least one controller configured to control the temperature of at least one of the member, dewetting phase, and polymerizable liquid.

10. The apparatus of claim 1, wherein the dewetting phase comprises a mobile phase comprising a moving solid phase, a moving gel phase, a flowing fluid, or a combination of the foregoing.

* * * * *